(12) United States Patent
Kumar et al.

(10) Patent No.: US 12,032,621 B2
(45) Date of Patent: Jul. 9, 2024

(54) METHOD AND APPARATUS FOR RETRIEVING INTELLIGENT INFORMATION FROM ELECTRONIC DEVICE

(71) Applicant: Samsung Electronics Co., Ltd., Suwon-si (KR)

(72) Inventors: Sumit Kumar, Bangalore (IN); Barath Raj Kandur Raja, Bangalore (IN); Debi Prasanna Mohanty, Bangalore (IN); Gopi Ramena, Bangalore (IN); Hallah Zorinsangi, Bangalore (IN); Hema Aravindan, Bangalore (IN); Manoj Goyal, Bangalore (IN); Parmarth vawa Sarathi Rai, Bangalore (IN); Sukumar Moharana, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 17/420,033

(22) PCT Filed: Jan. 6, 2020

(86) PCT No.: PCT/KR2020/000210
§ 371 (c)(1),
(2) Date: Jun. 30, 2021

(87) PCT Pub. No.: WO2020/141961
PCT Pub. Date: Jul. 9, 2020

(65) Prior Publication Data
US 2022/0100789 A1    Mar. 31, 2022

(30) Foreign Application Priority Data

Jan. 4, 2019  (IN) .............................. 201941000486
Dec. 23, 2019  (IN) .......................... 2019 41000486

(51) Int. Cl.
*G06F 16/00*    (2019.01)
*G06F 16/41*    (2019.01)
(Continued)

(52) U.S. Cl.
CPC .............. *G06F 16/45* (2019.01); *G06F 16/41* (2019.01); *G06F 16/48* (2019.01);
(Continued)

(58) Field of Classification Search
CPC .......... G06F 16/45; G06F 16/41; G06F 16/48; G06F 16/9535; G06F 40/20; G06F 3/167;
(Continued)

(56) References Cited

U.S. PATENT DOCUMENTS

2010/0030775 A1    2/2010  Mohajer et al.
2010/0146009 A1    6/2010  Kandekar et al.
(Continued)

FOREIGN PATENT DOCUMENTS

KR    10-2017-0056833 A    5/2017
KR    10-1934108 B1    12/2018

OTHER PUBLICATIONS

European Search Report dated Oct. 22, 2021, issued in European Application No. 20735982.9.
(Continued)

*Primary Examiner* — Paul Kim
(74) *Attorney, Agent, or Firm* — Jefferson IP Law, LLP

(57) ABSTRACT

Accordingly, embodiments herein disclose a method and apparatus for retrieving intelligent information from an electronic device (100). The method includes receiving, by the electronic device (100), an input from a user. Further, the method includes identifying, by the electronic device (100), at least one data item to generate at least one metadata tag. Further, the method includes automatically generating, by the electronic device (100), the at least one metadata tag
(Continued)

related to the at least one data item based on a plurality of parameters. Further, the method includes providing, by the electronic device (100), at least one priority to the at least one metadata tag. Further, the method includes storing, by the electronic device (100), the at least one metadata tag at the electronic device (100).

18 Claims, 45 Drawing Sheets

(51) Int. Cl.
    *G06F 16/45*     (2019.01)
    *G06F 16/48*     (2019.01)
    *G06F 16/9535*     (2019.01)
    *G06F 40/20*     (2020.01)
    *G06V 10/20*     (2022.01)
    *G10L 25/51*     (2013.01)

(52) U.S. Cl.
    CPC .......... *G06F 16/9535* (2019.01); *G06F 40/20* (2020.01); *G06V 10/20* (2022.01); *G10L 25/51* (2013.01)

(58) Field of Classification Search
    CPC .... G06F 16/383; G06F 16/583; G06F 16/683; G06F 16/783; G06F 16/908; G06V 10/20; G10L 25/51; G06N 3/006; G06N 3/045; G06N 5/022
    See application file for complete search history.

(56) References Cited

U.S. PATENT DOCUMENTS

| | | |
|---|---|---|
| 2010/0246965 A1 | 9/2010 | Epshtein et al. |
| 2012/0047436 A1 | 2/2012 | Giblin |
| 2013/0325462 A1 | 12/2013 | Somekh et al. |
| 2015/0100578 A1* | 4/2015 | Rosen ................ G06Q 10/1093 |
| | | 707/737 |
| 2016/0283595 A1 | 9/2016 | Folkens et al. |
| 2016/0322081 A1 | 11/2016 | Schileru |
| 2017/0169037 A1* | 6/2017 | Qu .......................... G06F 16/35 |
| 2017/0169337 A1 | 6/2017 | Mathew et al. |
| 2018/0012110 A1 | 1/2018 | Souche et al. |
| 2020/0320086 A1* | 10/2020 | Liu ....................... G06F 16/367 |

OTHER PUBLICATIONS

Indian Office Action dated Mar. 31, 2021, issued in Indian Application No. 201941000486.
International Search Report dated Apr. 21, 2020, issued in International Application No. PCT/KR2020/000210.
European Office Action dated Apr. 24, 2023, issued in European Application No. 20735982.9.

* cited by examiner

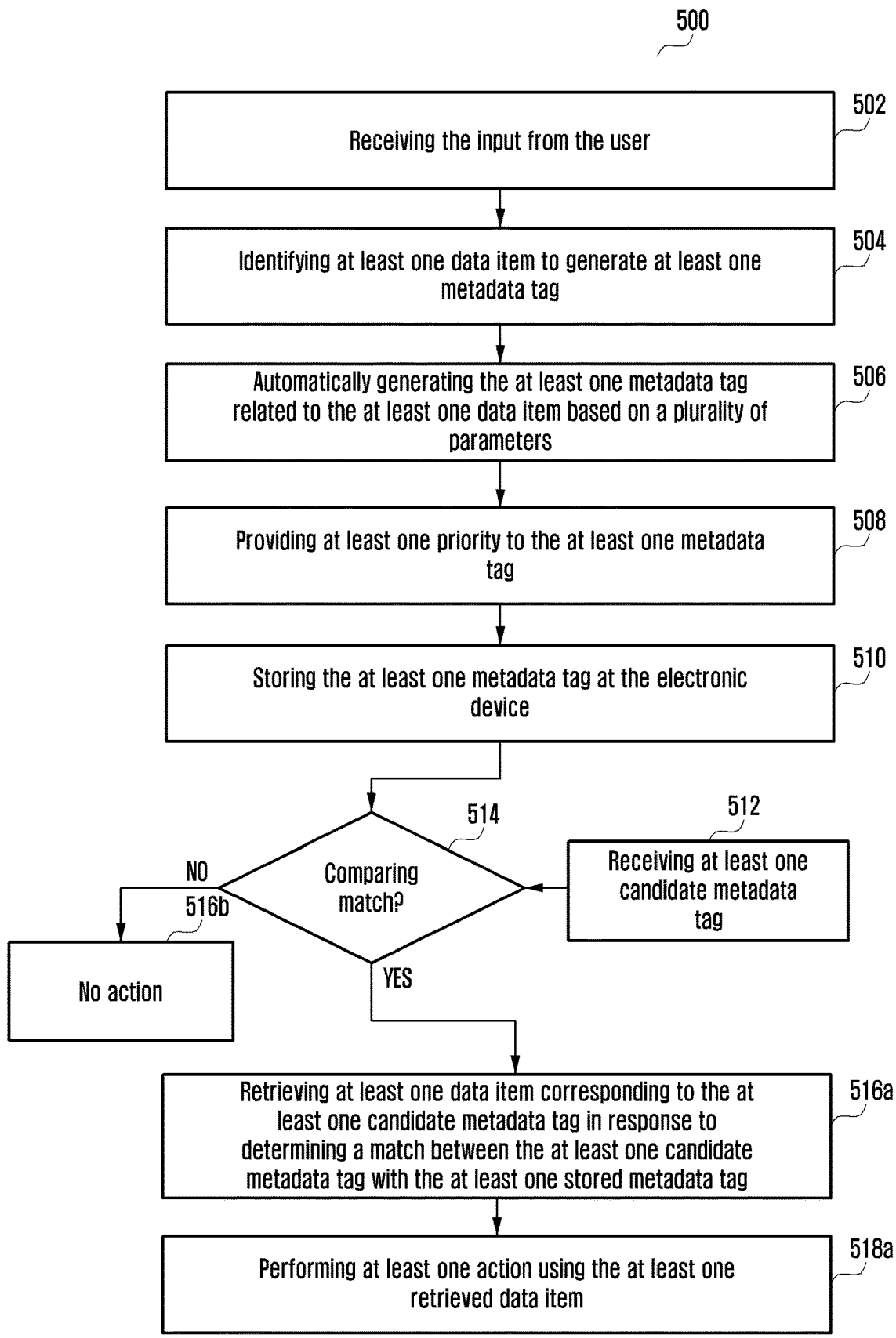

METHOD AND APPARATUS FOR RETRIEVING INTELLIGENT INFORMATION FROM ELECTRONIC DEVICE

CROSS-REFERENCE TO RELATED APPLICATION(S)

This application is a U.S. National Stage application under 35 U.S.C. § 371 of an International application number PCT/KR2020/000210, filed on Jan. 6, 2020, which is based on and claims priority of an Indian provisional patent application number 201941000486, filed on Jan. 4, 2019, in the Indian Patent Office, and of an Indian non-provisional patent application number 201941000486, filed on Dec. 23, 2019, in the Indian Patent Office, the disclosure of each of which is incorporated by reference herein in its entirety.

TECHNICAL FIELD

The present disclosure relates to machine learning (ML) and artificial intelligence (AI), and more specifically related to a method and apparatus for retrieving intelligent information from an electronic device.

BACKGROUND ART

In general, a user has a large amount of data in an electronic device (e.g. data item such as captured pictures, screenshots, web browsing, and call recording) (as shown in FIG. 1). Each time the user wants to access for example a specific image/data, then the user has to scan for specific information/relevant data manually from the large amount of data contained in the electronic device. There is no easy way to smartly retrieve such data in an existing system and the existing methods can be cumbersome and may hamper user experience. Since, finding the relevant data is an important task, the issues in the existing system need to be addressed. To address the task, collaboration between data retrieval techniques, machine learning (ML) and artificial intelligence (AI) is needed.

Thus, it is desired to address the above mentioned disadvantages or other shortcomings or at least provide a useful alternative.

DISCLOSURE OF INVENTION

Technical Problem

The principal object of the embodiments herein is to provide a method and apparatus for retrieving intelligent information from an electronic device.

Another object of the embodiments is to receive an input from a user and identify at least one data item to generate at least one metadata tag.

Another object of the embodiments is to automatically generate the at least one metadata tag related to the at least one data item based on a plurality of parameters and provide at least one priority to the at least one metadata tag.

Another object of the embodiments is to receive at least one candidate metadata tag and compare at least one candidate metadata tag with the at least one stored metadata tag.

Another object of the embodiments is to retrieve at least one data item corresponding to the at least one candidate metadata tag in response to determining a match between the at least one candidate metadata tag with the at least one stored metadata tag and perform at least one action using the at least one retrieved data item.

Solution to Problem

Accordingly, embodiments herein disclose a method and apparatus for retrieving intelligent information from an electronic device. The method includes receiving, by the electronic device, a direct input or indirect input (e.g. taking a screenshot) from a user. Further, the method includes identifying, by the electronic device, at least one data item to generate at least one metadata tag. Further, the method includes automatically generating, by the electronic device, the at least one metadata tag related to the at least one data item based on a plurality of parameters. Further, the method includes providing, by the electronic device, at least one priority to the at least one metadata tag. Further, the method includes storing, by the electronic device, the at least one metadata tag at the electronic device.

In an embodiment, the method further comprises receiving, by the electronic device, at least one candidate metadata tag. Further, the method includes comparing, by the electronic device, the at least one candidate metadata tag with the at least one stored metadata tag. Further, the method includes retrieving, by the electronic device, at least one data item corresponding to the at least one candidate metadata tag in response to determining a match between the at least one candidate metadata tag with the at least one stored metadata tag. Further, the method includes performing, by the electronic device, at least one action using the at least one retrieved data item.

In an embodiment, the at least one data item is retrieved based on the priority associated with the at least one candidate metadata tag.

In an embodiment, the method includes identifying, by the electronic device, at least one of an image block, a text block, and an audio block available in the data item. Further, the method includes determining, by the electronic device, the plurality of parameters associated with the at least one of the image block, text block, and audio block. Further, the method includes generating, by the electronic device, the at least one metadata tag related to the at least one data item based on the plurality of parameters.

In an embodiment, the plurality of parameters of image block comprises at least one of scene object block, expression block, face block, and activity block.

In an embodiment, the plurality of parameters of text block comprises at least one of a keyword block, a language identification block, a classification block, a text summary block, and an electronic device content aggregator block.

In an embodiment, the plurality of parameters of audio block comprises at least one of audio summary and language identification.

In an embodiment, the electronic device locally generates the at least one metadata tag without interacting with any network devices.

In an embodiment, the at least one metadata tag is customizable by the user.

In an embodiment, the at least one data item comprises an image file, a video file, an audio file, and a text document.

Accordingly, the embodiments herein provide an electronic device for retrieving intelligent information. The electronic device includes a processor and a memory. The processor is configured to receive an input from a user. Further, the processor is configured to identify at least one data item to generate at least one metadata tag. Further, the processor is configured to automatically generate the at least one metadata tag related to the at least one data item based on a plurality of parameters. Further, the processor is configured to provide at least one priority to the at least one metadata tag. Further, the processor is configured to store the at least one metadata tag at the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to various embodiments, the electronic device may provide for retrieving intelligent information from an electronic device. According to various embodiments, it may be possible to receive an input from a user and identify at least one data item to generate at least one metadata tag. According to various embodiments, it may be possible to automatically generate the at least one metadata tag related to the at least one data item based on a plurality of parameters and provide at least one priority to the at least one metadata tag.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 5 is a flow diagram illustrating a method used to retrieve the intelligent information from the electronic device, according to an embodiment as disclosed herein;

MODE FOR THE INVENTION

Figure 1:
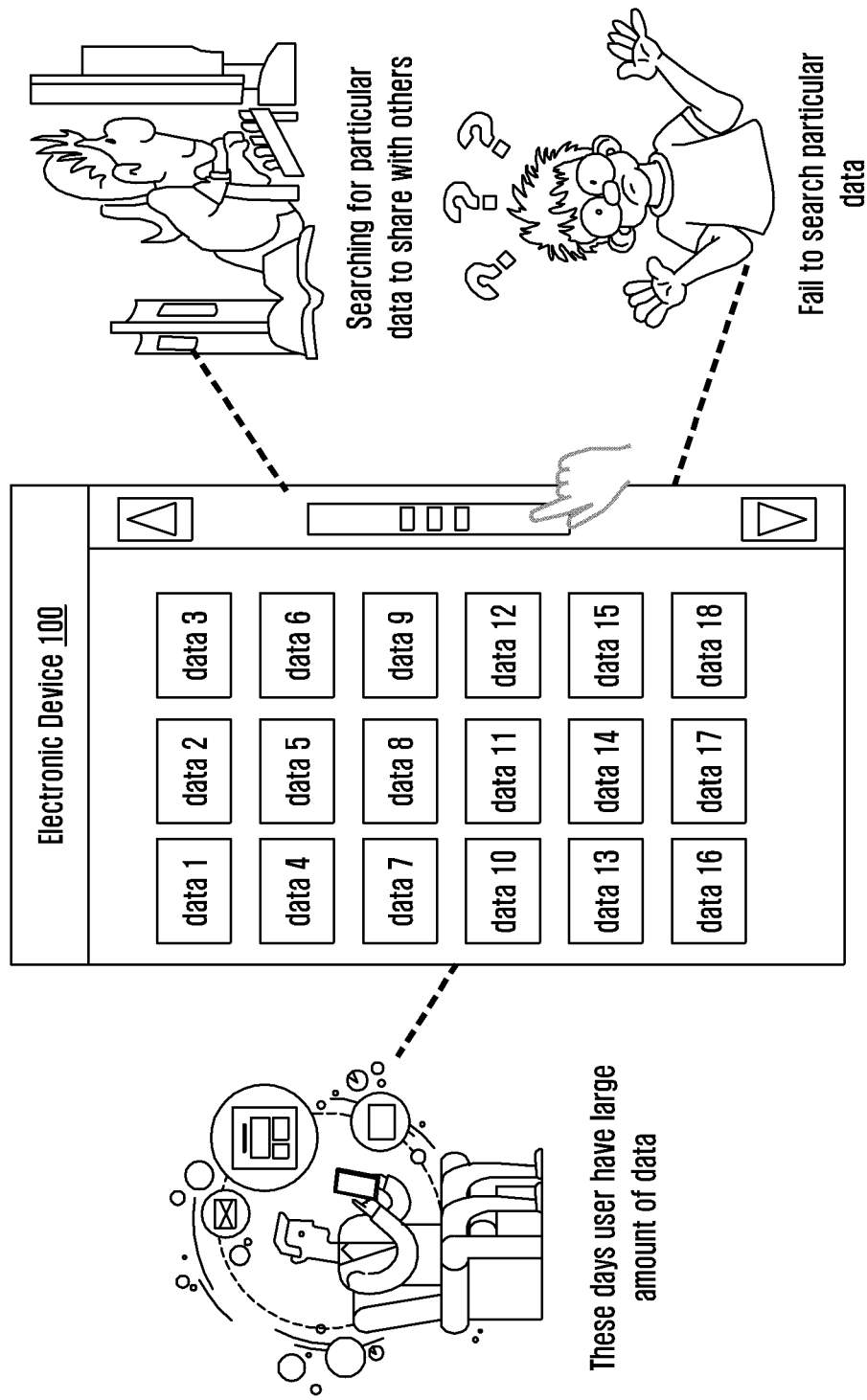
FIG. 1 illustrates an existing search system for particular data for quick reference or share with at least one second user by an electronic device, according to a prior art disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method and apparatus for retrieving intelligent information from an electronic device. The method includes receiving, by the electronic device, a direct input or indirect input from a user. Further, the method includes identifying, by the electronic device, at least one data item to generate at least one metadata tag. Further, the method includes automatically generating, by the electronic device, the at least one metadata tag related to the at least one data item based on a plurality of parameters. Further, the method includes providing, by the electronic device, at least one priority to the at least one metadata tag. Further, the method includes storing, by the electronic device, the at least one metadata tag at the electronic device.

Referring now to the drawings, and more particularly to FIGS. 2 through 15B, there are shown preferred embodiments.

Figure 2:
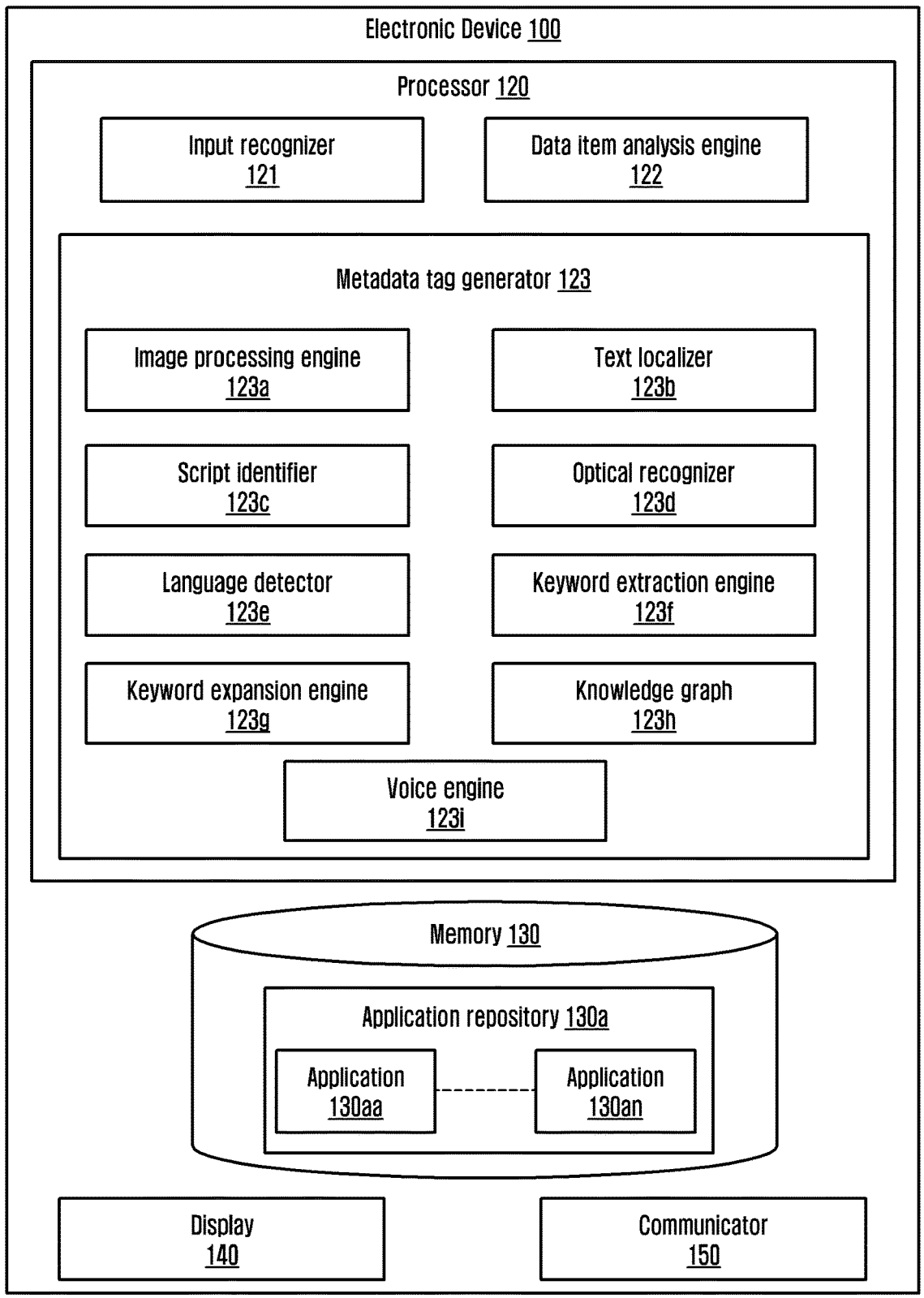
FIG. 2 illustrates a block diagram of the electronic device to retrieve intelligent information, according to an embodiment as disclosed herein.

FIG. 2 illustrates a block diagram of an electronic device (100) to retrieve intelligent information, according to an embodiment as disclosed herein. The electronic device (100) can be, for example, but not limited to a smartphone, a laptop, a desktop, a smartwatch, a smart TV or a like. In an embodiment, the electronic device (100) includes a processor (120), a memory (130), a display (140), and a communicator (150).

The processor (120) communicates with the memory (130), the display (140), and the communicator (150). The processor (120) is configured to execute instructions stored in the memory (130) and to perform various processes.

In an embodiment, the processor (120) is configured to receive an input (e.g. by a gesture, touchscreen, vocal communication) from a user. Further, the processor (120) is configured to identify at least one data item (e.g. an image file, a video file, an audio file, and a text document) to generate at least one metadata tag (e.g. smart summarizer). Further, the processor (120) is configured to automatically generate the at least one metadata tag related to the at least one data item based on a plurality of parameters. Where the plurality of parameters uses knowledge graph. Further, the processor (120) is configured to provide at least one priority to the at least one metadata tag. Further, the processor (120) is configured to store the at least one metadata tag at the electronic device (100).

In an embodiment, the processor (120) is configured to receive at least one candidate metadata tag (e.g. tag entered by the user). Further, the processor (120) is configured to compare the at least one candidate metadata tag with the at least one stored metadata tag. Further, the processor (120) is configured to retrieve at least one data item corresponding to the at least one candidate metadata tag in response to determining a match between the at least one candidate metadata tag with the at least one stored metadata tag. Further, the processor (120) is configured to perform at least one action (e.g. share at least one data item with at least one-second user, store at least one data item in the electronic device (100)) using the at least one retrieved data item.

In an embodiment, the at least one data item is retrieved based on the priority associated with the at least one candidate metadata tag.

In an embodiment, the processor (120) is configured to identify at least one of an image block, a text block, and an audio block available in the data item. Further, the processor (120) is configured to determine the plurality of parameters associated with the at least one of the image block, text block, and audio block. Further, the processor (120) is configured to generate the at least one metadata tag related to the at least one data item based on the plurality of parameters.

In an embodiment, the plurality of parameters of image block comprises at least one of scene object block (e.g. sand, flower, computer), expression block (e.g. funny, pout, surprise), face block (e.g. user's face recognition), and activity block (e.g. running, dancing, sleeping, singing, swimming).

In an embodiment, the plurality of parameters of text block comprises at least one of a keyword block (e.g. Seoul, Stark, 7$), a language identification block (e.g. Spanish, Hindi, Korean), a classification block, a text summary block (e.g. abstractive, extractive), and an electronic device content aggregator block (e.g. calendar information, weather information, location information, application category information, application metadata).

In an embodiment, the plurality of audio block comprises at least one of audio summary, and language identification (e.g. Spanish, Hindi, Korean). The electronic device (100) locally generates the at least one metadata tag without interacting with any network devices. The at least one metadata tag is customizable by the user.

In an embodiment, the processor (120) includes an input recognizer (121), a data item analysis engine (122), and a metadata tag generator (123).

The input recognizer (121) receives the input from the user. The data item analysis engine (122) identifies at least one data item (e.g. at least one of the image, text, audio) to generate at least one metadata tag. The metadata tag generator (123) automatically generates the at least one metadata tag related to the at least one data item based on a plurality of parameters. Further, the metadata tag generator (123) includes an image processing engine (123a), a text localizer (123b), a script identifier (123c), an optical recognizer (123d), a language detector (123e), a keyword extraction engine (123f), a keyword expansion engine (123g), a knowledge graph (123h), and a voice engine (123i).

The image processing engine (123a) performs a bilateral filter process on the image. Further, the image processing engine (123a) converts the bilateral image into a grayscale image. Further, the image processing engine (123a) performs a custom binarization on the grayscale image. Further, the image processing engine (123a) extracts features from the image to generate feature tags. The text localizer (123b) determines text region/block in the grayscale image. The script identifier (123c) recognizes a script for determined text region of the grayscale image.

The optical recognizer (123d) based on deep neural networks recognizes the text region and extracts the text from the image. Further, the language detector (123e) identifies language of the text for each script and stores identified language. The keyword extraction engine (123f) receives the extracted text from the optical recognizer (123d) in live pipeline, language details from the language detector (123e), and load language specific neural model to extract the most important part of the text. The keyword expansion engine (123g) adds new keywords in the current text, where the new keywords highly correlated, synonyms, or strongly related to the text. The knowledge graph (123h) determines rank of each keyword of the text based on the user personalized summary. The voice engine (123i) converts incoming voice signals into text and fed to the live pipeline to generate metadata tags on the electronic device (100).

The memory (130) also stores instructions to be executed by the processor (120). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache). In an embodiment, the memory (130) can be an internal storage unit or it can be an external storage unit of the electronic device (100), a cloud storage, or any other type of external storage.

The memory (130) includes an application repository (130a) to store metadata tags of different candidate application (e.g., calling application, gallery application, camera application, business application, education application, lifestyle application, entertainment application, utility application, travel application, health and fitness application).

The communicator (150) is configured for communicating internally between internal hardware components and with external devices via one or more networks.

Although the FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the invention. One or more components can be combined together to perform same or substantially similar function to retrieve information intelligently.

Figure 3A:
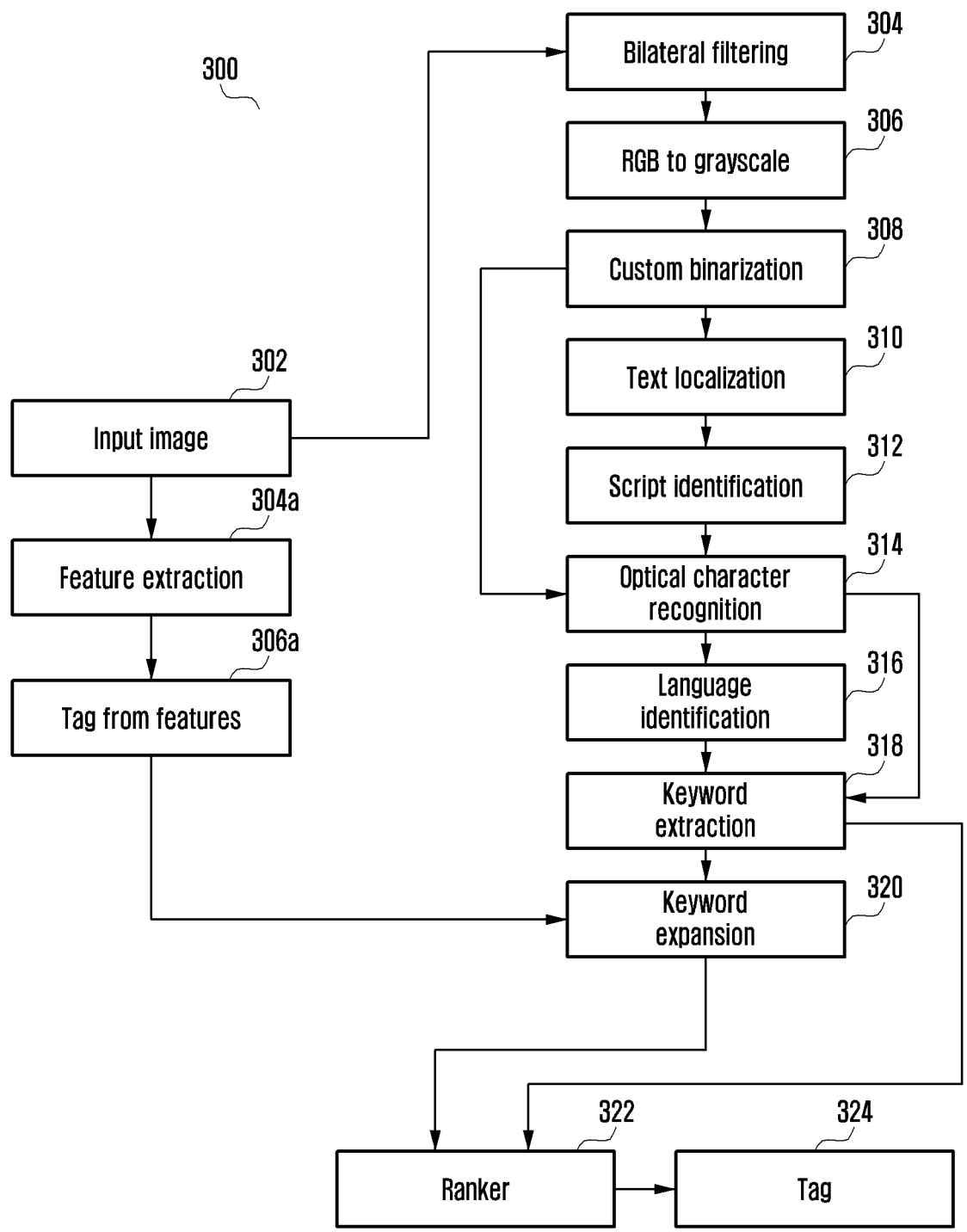
FIGS. 3A and 3B are a flow diagram illustrating a method to generate metadata tag in the electronic device, according to an embodiment as disclosed herein.
Figure 3B:
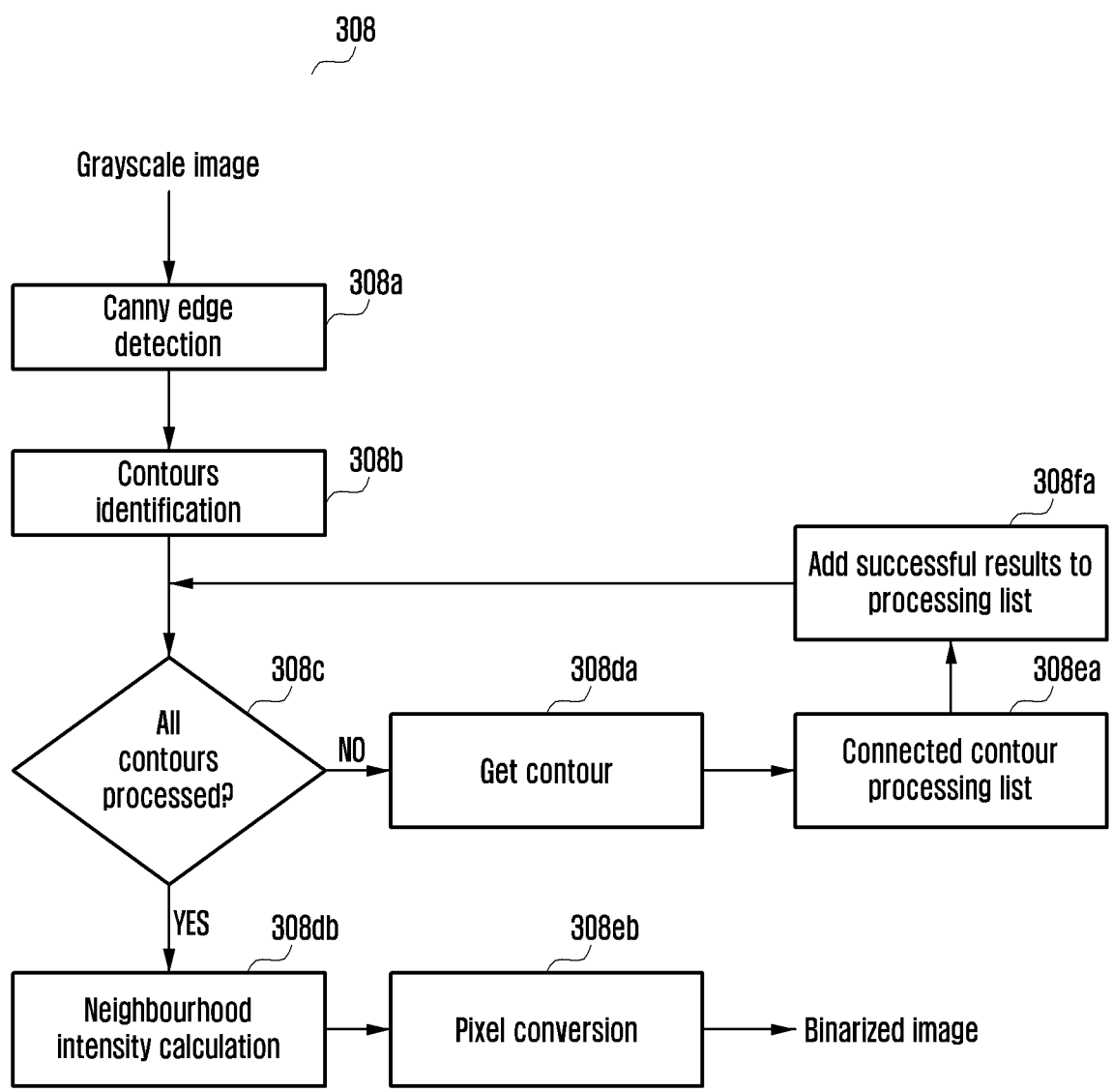
Figure 4A:
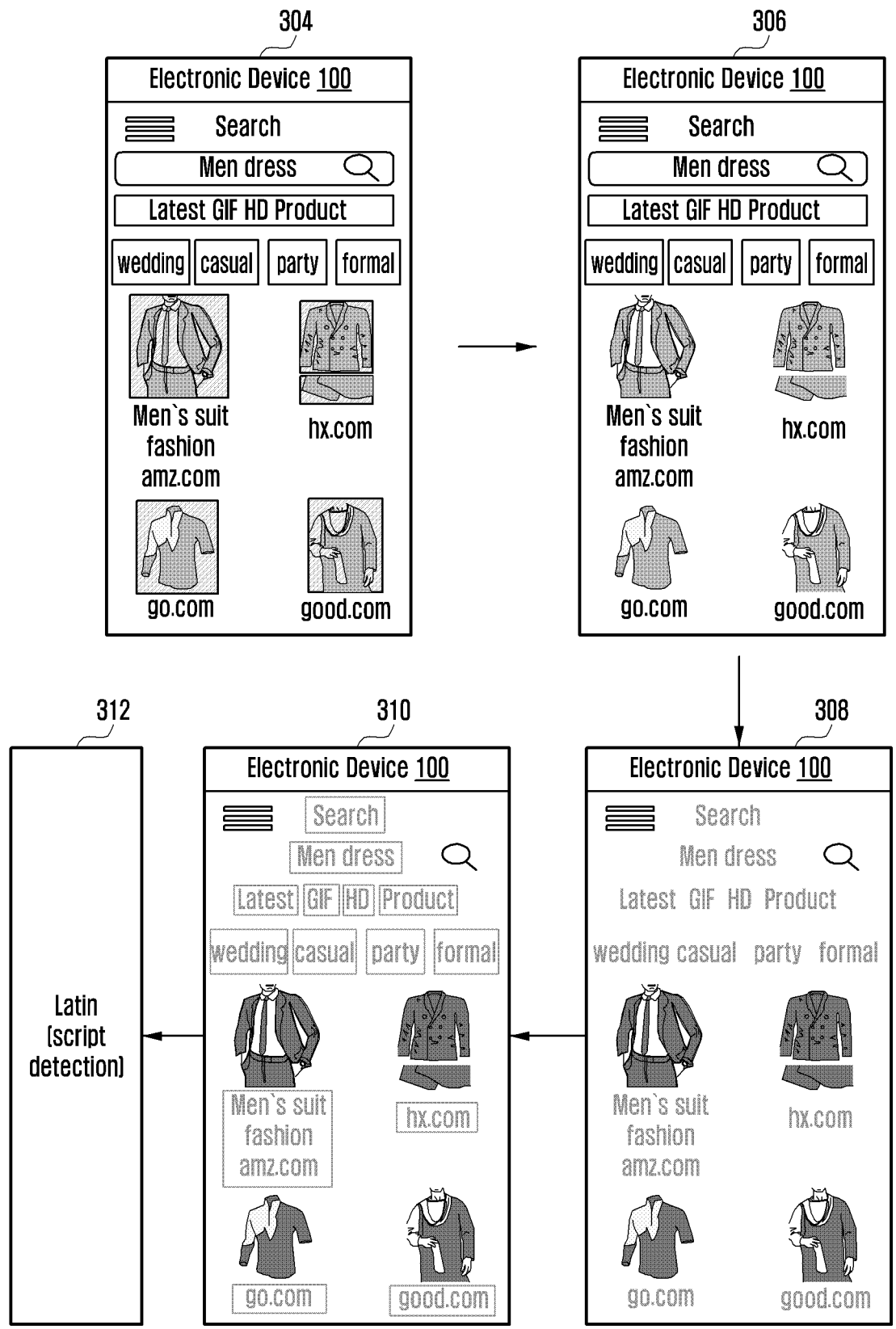
FIGS. 4A, 4B, 4C, and 4D are an example illustration of the method to generate metadata tag in the electronic device, according to an embodiment as disclosed herein.
Figure 4B:
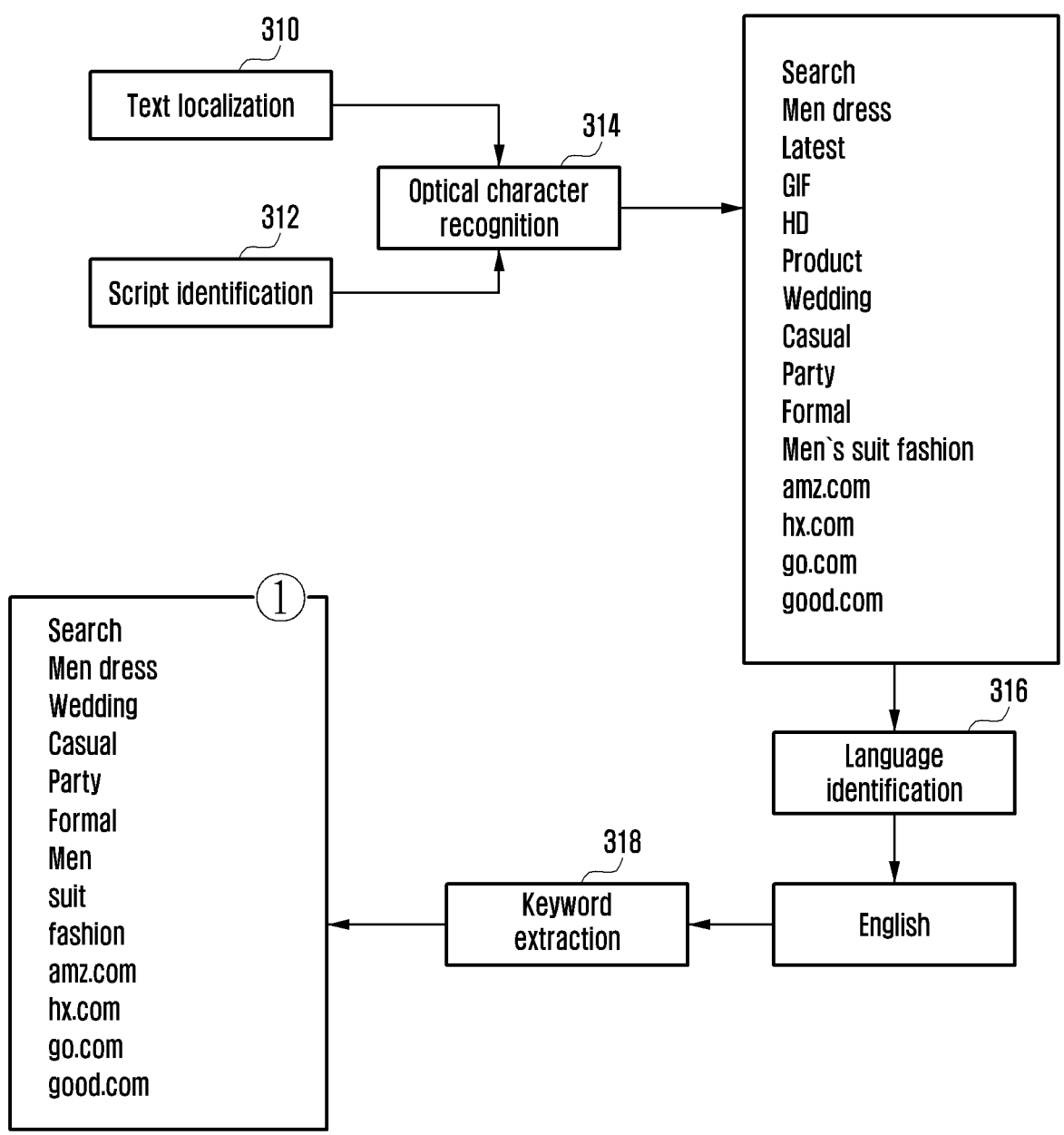
Figure 4C:
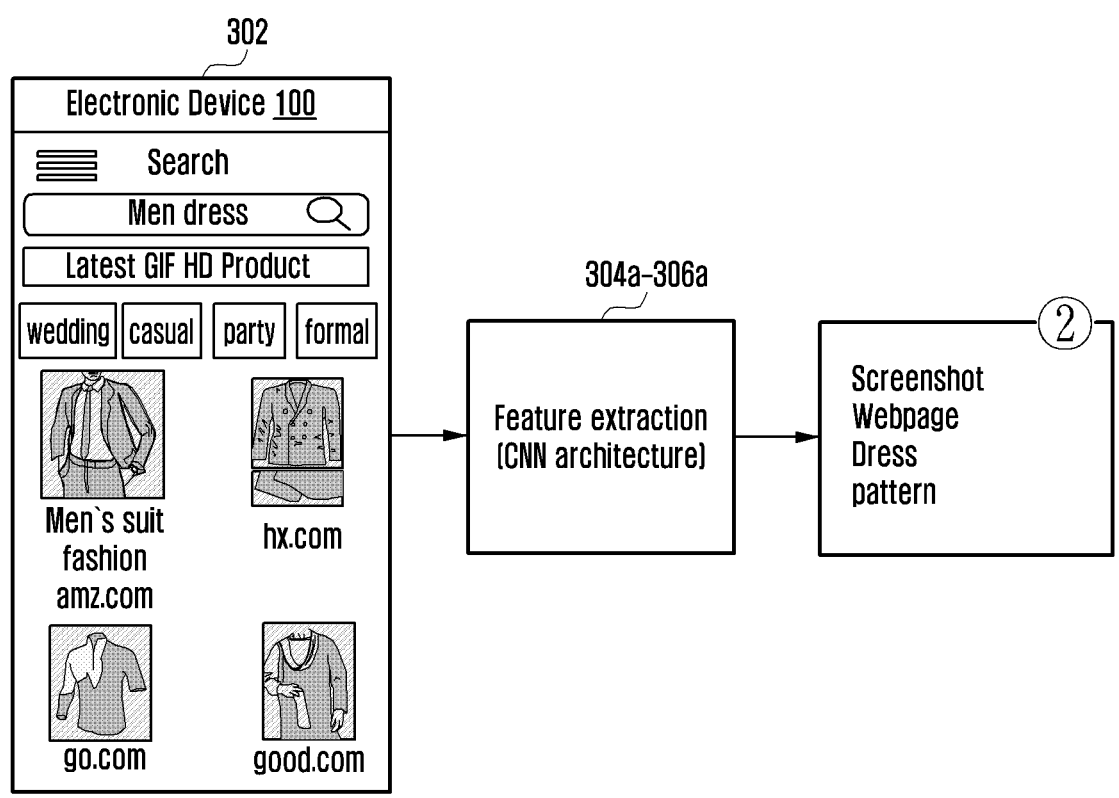
Figure 4D:
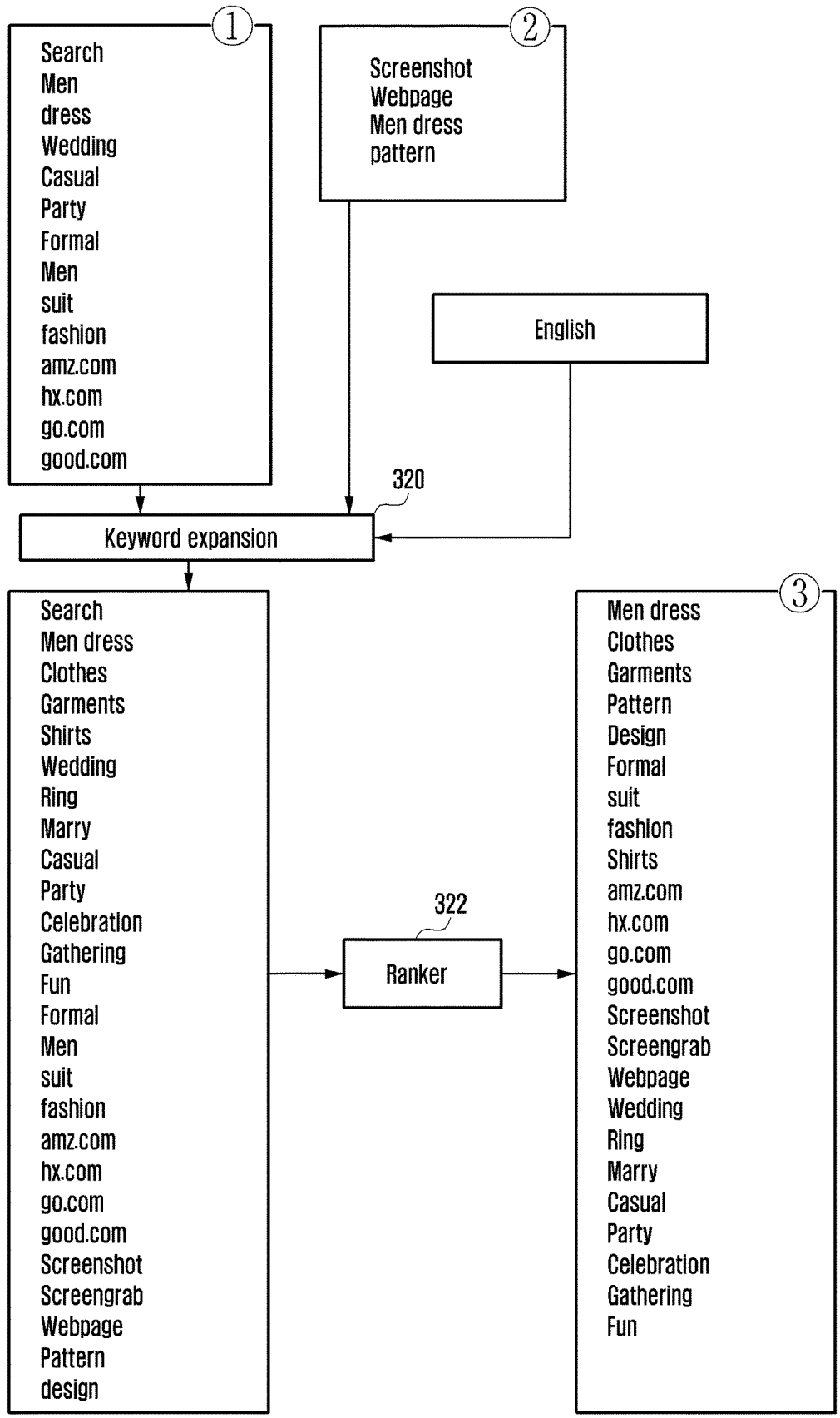

FIGS. 3A and 3B are a flow diagram illustrating a method to generate metadata tag in the electronic device (100), according to an embodiment as disclosed herein. The operations (302-324) are performed by the electronic device (100).

The notation "a" indicates, at 302, the method includes identifying at least one image on the display (140). At 304, the method includes performing the bilateral filter process on the image. The bilateral filter process for edge-preserving smoothing. At 306, the method includes converting the bilateral image into the grayscale image. At 308, the method includes performing the custom binarization on the grayscale image. A detailed description of the custom binarization is given in notation "b". At 310, the method includes performing a text localization (i.e. on device text localization/not connected with external network), by the text localizer (123b), using a Canny edge detection. The Canny edge detection is used to measure edges of the horizontal and vertical axis present around the text region/block in the grayscale image. At 312, the method includes the script identification (i.e. on device script identification/not connected with external network), by the DNN based script identifier (123c), takes the text block as input and recognize a script (e.g. "Latin", "Cyrillic", "Chinese", "Japanese", "Korean", "Ashoka") of the text.

At 314, optical character recognition (OCR), by the optical recognizer (123d), takes the custom binarization output and script identification output as an input. The optical recognizer (123d) is script dependent. Hence, the script identification is optimally loaded in the optical recognizer (123d) for making solution on the electronic device (100). Further, the script identification loaded necessary script resources for neural model for optical character recognition. The optical recognizer (123d) recognizes the text region and compares the text with databases, which consists of different types of character and extracts the text from the image using the DNN. At 316, the method includes automatically identifying language by the DNN based language detector (123e) (i.e. on device language detector/not connected with external network). Further, the identified language stored in the language detector (123e). For each script, there are multiple languages (e.g. Latin has more than 40 languages, Ashoka has more than 15 languages). Loading all languages leads to memory issue. To overcome the memory issue, the proposed system uses the language detector (123e) to add languages dynamically in the electronic device (100).

At 318, the keyword extraction engine (123f) takes the language detector (123e) output and the optical recognizer (123d) output as an input. The keyword extraction engine (123f) is language-dependent, each language has its own set of grammar, and hence detecting language is important for identifying keywords correctly. The keyword extraction engine (123f) analysis the text and extract the most important texts from the text. This helps to summarize the content of the text and recognize the main topic.

At 304a-306a, the feature extraction, by the image-processing engine (123a), uses DNN like convolution neural network (CNN) architecture to extract features from at least one image on the display (140) and generates tags based on the extracted feature.

At 320, the keyword expansion engine (123g) module takes the extracted feature tag output and the keyword extraction engine (123f) output as an input. The keyword expansion engine (123g) is language-dependent. The keyword expansion engine (123g) adds new keywords in the current text, where the new keywords highly correlated, synonyms, or strongly related to the text in the text. At 322-324, ranking, by the knowledge graph (123), decides rank of each keyword of the text based on the user personalized summary.

In an embodiment, the notation "b" indicates the custom binarization. At 308a, the method includes detecting edges using the canny edge on the grayscale image. At 308b, the method includes identifying contours by using the detected edges. With those contours, connected component is evaluated. At 308c, the method includes deciding contours processing have to proceed further or not. At 308da-308fa, the method includes processing on contours to add successfully into processing list. At 308db-308eb, the method includes calculating intensity of all neighborhood points and accordingly decision is taken to convert that pixel into white or black. To optimize, processing is done in four different threads which speed up the process of the custom binarization.

FIGS. 4A, 4B, 4C, and 4D are an example illustration of the method to generate metadata tags in the electronic device (100), according to an embodiment as disclosed herein. The technical functionality is already explained in the FIGS. 3A and 3B.

The user of the electronic device (100) searches for "Men dress" in the search browser and take screenshot of the displayed webpage. Screenshot can trigger a visual cue to user to initiate tag extraction or can directly trigger tag extraction. The method identifies the image of Men dress on the display (140) and perform various image processing operation at 304-308. At 310, the method detects text region of displayed item. At 312, the method is used to identify the script based on the detected text. At 314, the method recognize the text region such as "search", "Men dress", "latest", "GIF", "HD", "Product", "wedding", "casual", "party", "formal", "Men's suit fashion", "amz.com", "hx.com", "go.com", "good.com". At 316, the method is used to identify language based on the text region. In the example, the identified language is English.

At 318, as notation "1", the method analysis the text region and extract the most important texts such as "search", "Men dress", "wedding", "casual", "party", "formal", "Men", "suit", "fashion", "amz.com", "hx.com", "go.com", "good.com".

At 304a-306a, the method extract features of displayed item and generates tags, as notation "2", such as "screenshot", "webpage", "Dress", "pattern". At 320, the method add new keywords such as "Clothes", "Garments", "Shirts", "Ring", "Marry", "Celebration", "Gathering", "Fun", "Screengrab", "design". At 322, the method rank of each keyword based on the user personalized summary. The notation "3" shows final text output/tags generated based on displayed item of the search browser.

FIG. 5 is a flow diagram (500) illustrating a method used to retrieve the intelligent information from the electronic device (100), according to an embodiment as disclosed herein. The operations (502-518a) are performed by the electronic device (100).

At 502, the method includes receiving the input from the user. At 504, the method includes identifying at least one data item to generate at least one metadata tag. At 506, the method includes automatically generating the at least one metadata tag related to the at least one data item based on a plurality of parameters. At 508, the method includes providing at least one priority to the at least one metadata tag. At 510, the method includes storing the at least one metadata tag at the electronic device (100). At 512-514, the method includes comparing the at least one candidate metadata tag with the at least one stored metadata tag. At 516b, the method includes performing no action when at least one candidate metadata tag does not match with the at least one stored metadata tag. At 516a, the method includes retrieving at least one data item corresponding to the at least one candidate metadata tag when at least one candidate metadata tag does match with the at least one stored metadata tag. At 518a, the method includes performing at least one action using the at least one retrieved data item.

Figure 6A:
FIGS. 6A, 6B, and 6C are an example illustration of a smart metadata tags and summarization of textual content using a virtual assistant of the electronic device to retrieve the intelligent information, according to an embodiment as disclosed herein.
Figure 6B:
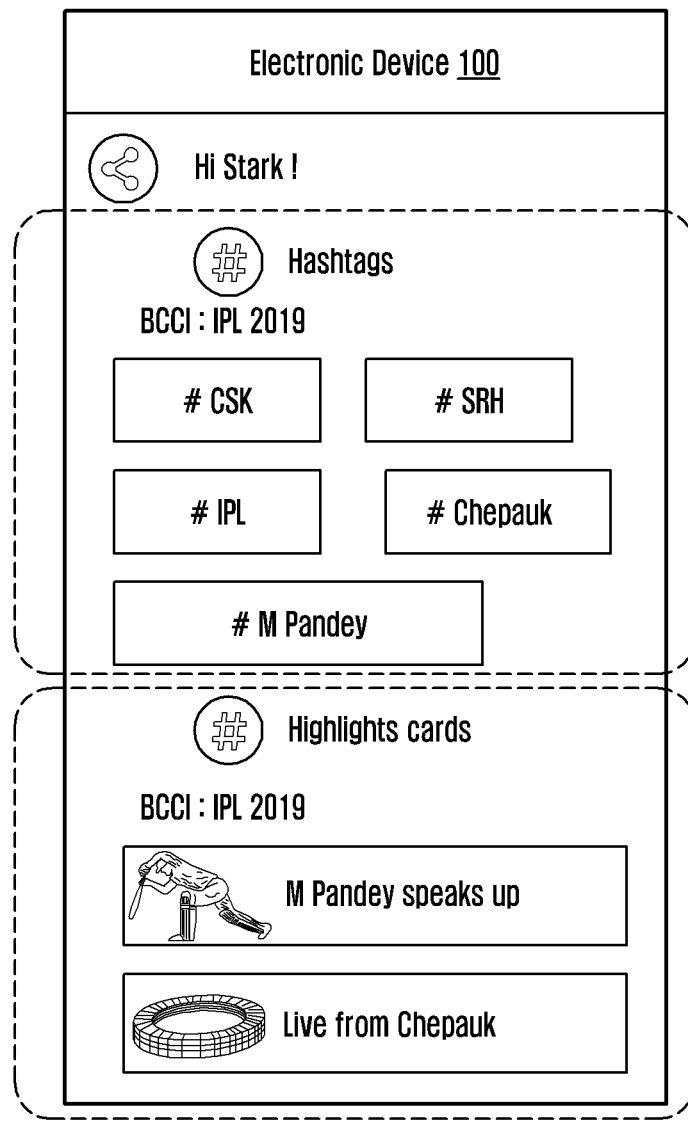
Figure 6C:
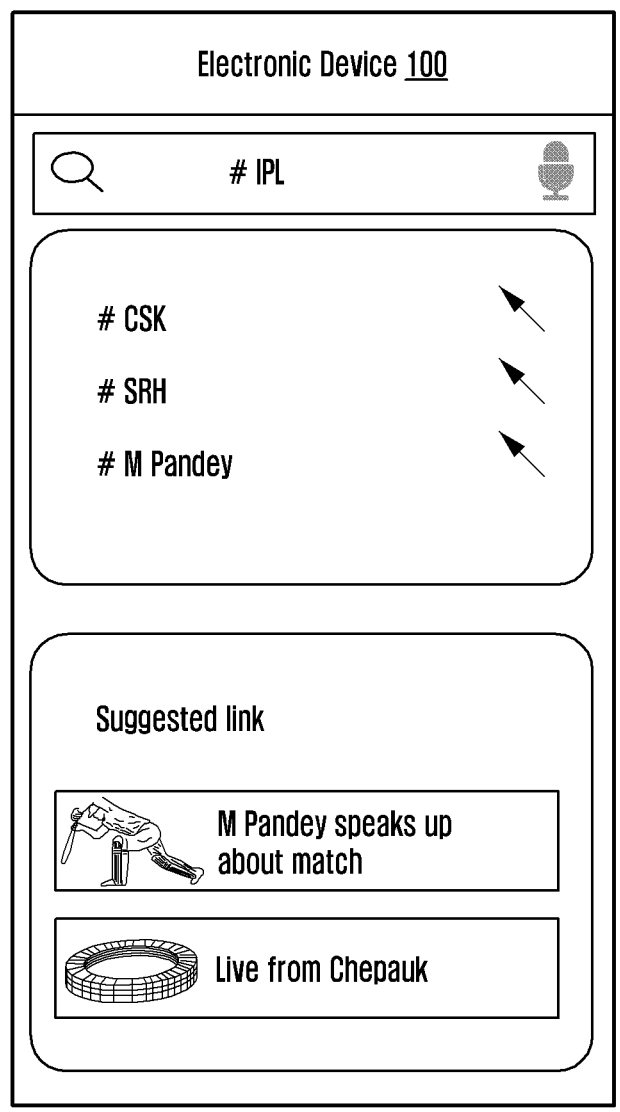
Figure 7A:
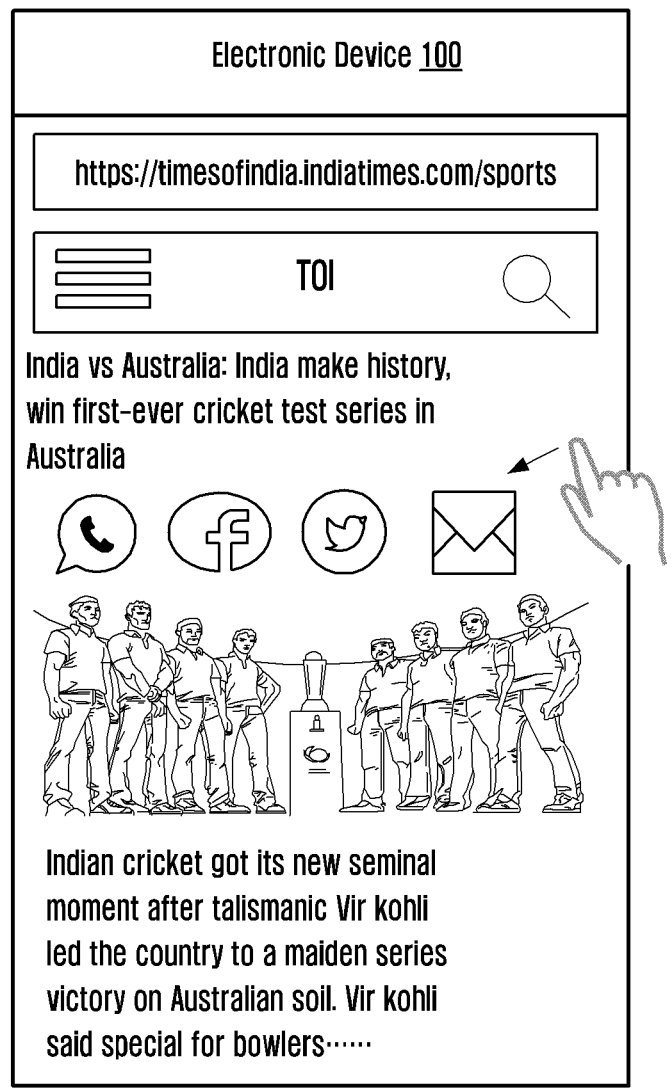
FIGS. 7A, 7B, 7C, and 7D are another example illustration of the smart metadata tags and summarization generated for a browser application of the electronic device, according to an embodiment as disclosed herein.
Figure 7B:
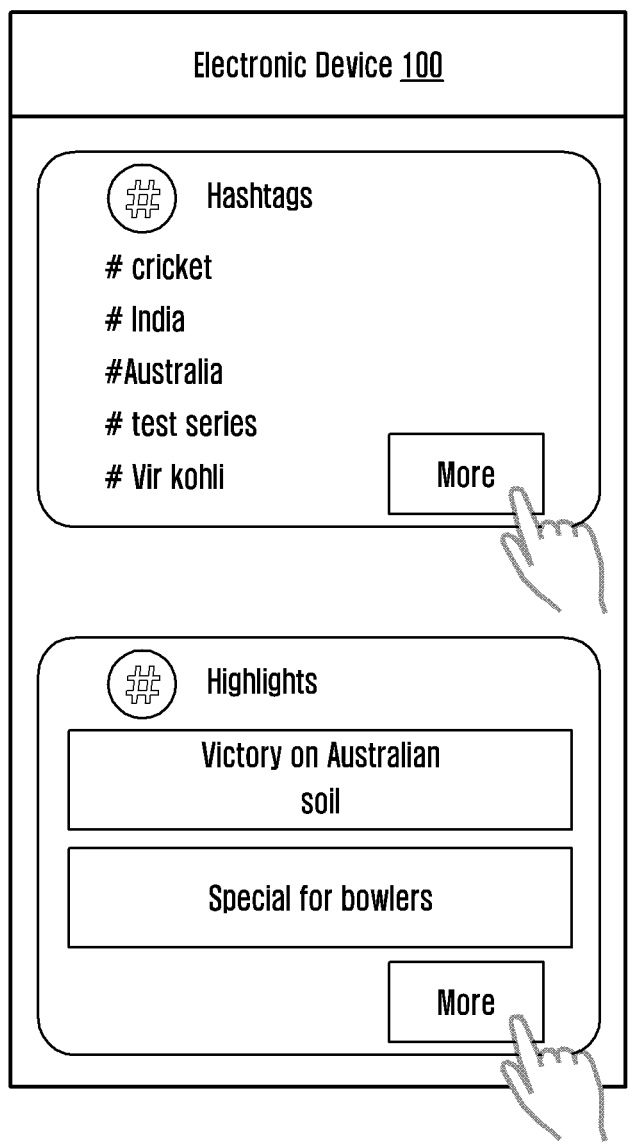
Figure 7C:
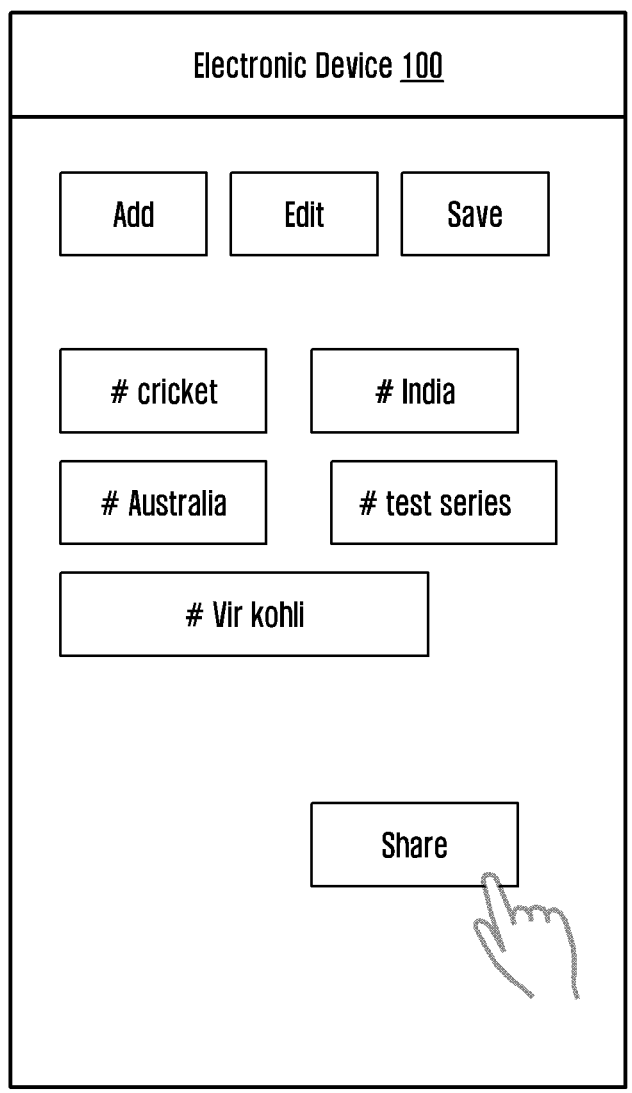
Figure 7D:
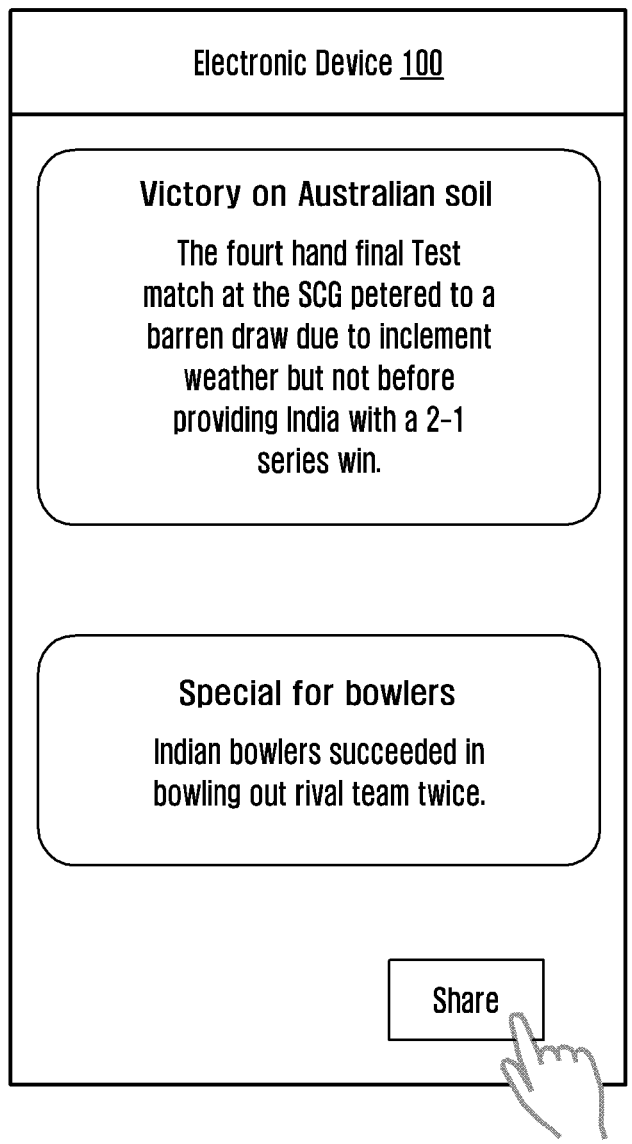

FIGS. 6A, 6B, and 6C are an example illustration of the smart metadata tags and summarization of textual content using a virtual assistant of the electronic device (100) to retrieve the intelligent information, according to an embodiment as disclosed herein.

The notation "a" indicates that the virtual assistant analyzes screen (i.e. display (140)) content of the electronic device (100). In the example, the screen content is related to cricket news. The notation "b" indicates that the electronic device (100) automatically generates the at least one metadata tag (e.g. hashtags, highlight cards) related to the screen content and the at least one metadata tag provides based on a priority of the user of the electronic device (100). In the example, the hashtags are "#CSK", "#SRH", "#IPL", "#Chepauk", and "#M Pandey". Further, the highlight cards are "M Pandey speaks up about match" and "Live from Chepauk". The generated hashtags can be edited in an expand mode (e.g. add more hashtags) by the user of the electronic device (100) and the highlight cards give detailed summaries of the screen content to the user of the electronic device (100). Further, the electronic device (100) stores all or at least one of the hashtag and the highlight card selected/created by the user.

The notation "c" indicates that the virtual assistant receives at least one candidate metadata tag. In the example, the candidate metadata tag is "#IPL". Then, the virtual assistant compares the candidate metadata tag with stored metadata tag and retrieves at least one data item (e.g. image, screenshot from the electronic device (100)) corresponding to the at least one candidate metadata tag.

FIGS. 7A, 7B, 7C, and 7D are another example illustration of the smart metadata tags and summarization generated for a browser application of the electronic device (100), according to an embodiment as disclosed herein.

The notation "a" indicates that the electronic device (100) receives the input (e.g. gesture, swipe) from the user of the electronic device (100). Then, the electronic device (100) analyzes screen content of the electronic device (100). In the example, the screen content is related to "India vs Australia". The notation "b" indicates that the electronic device (100) automatically generates the at least one metadata tag (e.g. hashtags, highlight cards) related to the screen content and the at least one metadata tag provides based on priority of the user of the electronic device (100). In the example, the hashtags are "#cricket", "#India", "#Australia", "#test series", and "#Vir Kohli". Further, the highlight cards are "Victory on Australian soil" and "Special for bowlers". The generated hashtags and the highlight cards have the expand mode (i.e. by press 'More' button).

The notation "c" indicates that the user of the electronic device (100) performs at least one of edit the generated hashtags/add new hashtags/save the hashtags in the electronic device (100). Further, the user of the electronic device (100) shares the hashtags with at least one-second user. The notation "d" indicates that the highlight cards give detailed summaries of the screen content to the user of the electronic device (100). Further, the electronic device (100) stores the highlight cards in the electronic device (100). Further, the user of the electronic device (100) shares the highlight cards with at least one-second user.

Figure 8A:
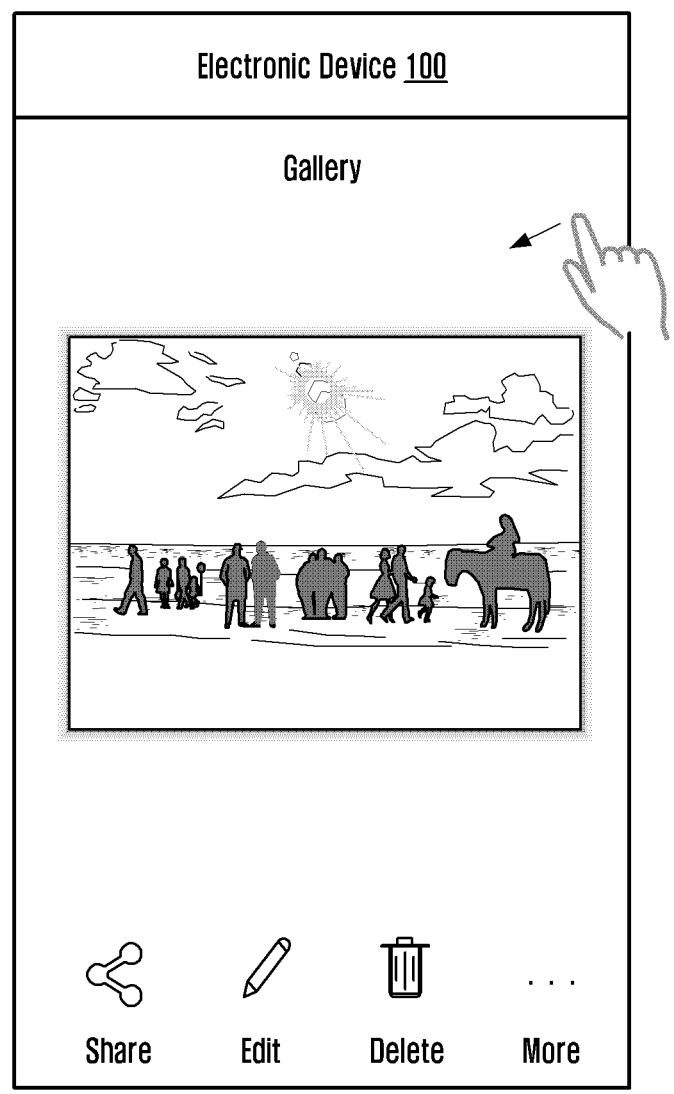
FIGS. 8A, 8B, and 8C are another example illustration to generate metadata tags based on image feature, according to an embodiment as disclosed herein.
Figure 8B:
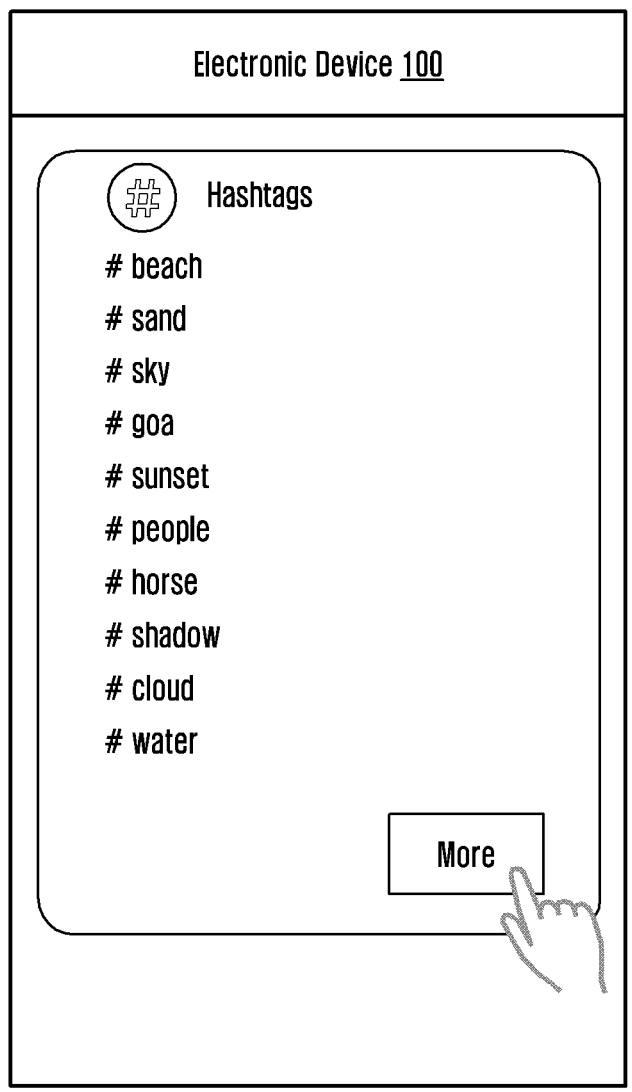
Figure 8C:
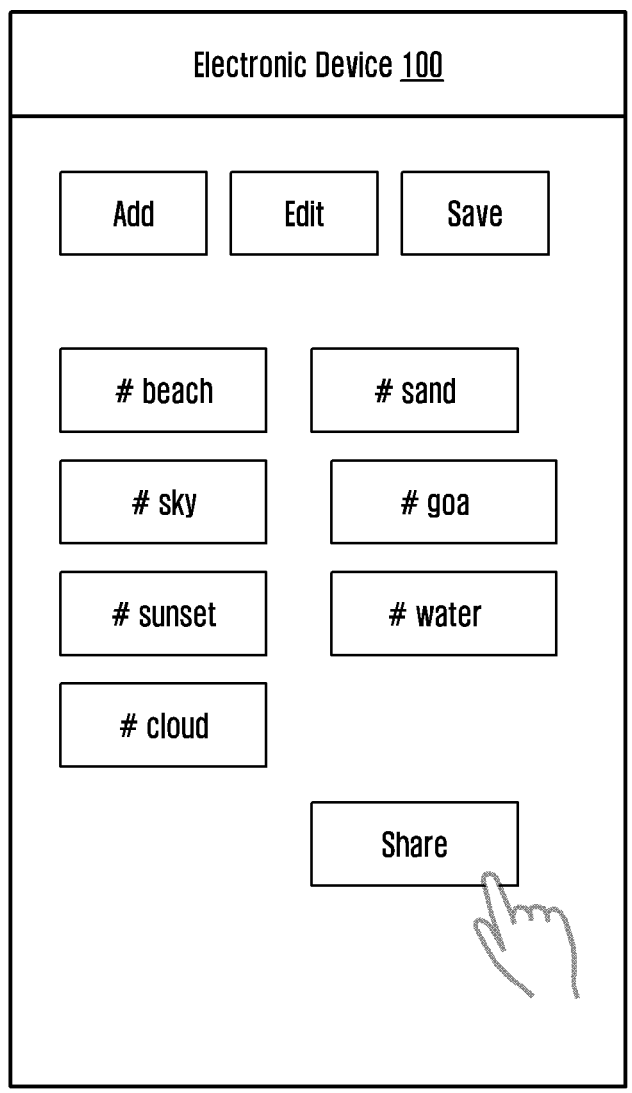

FIGS. 8A, 8B, and 8C are another example illustration to generate metadata tags based on image feature, according to an embodiment as disclosed herein. The notation "a" indicates that the electronic device (100) receives the input from the user of the electronic device (100). Then, the electronic device (100) analyzes screen content of the electronic device (100). In the example, the screen content is an image. The notation "b" indicates that the electronic device (100) automatically generates the at least one metadata tag (e.g. hashtags) related to the screen content and the at least one metadata tag provides based on priority of the user of the electronic device (100). In the example, the hashtags are "#beach", "#sand", "#sky", "#goa", "#sunset", "#people", "#horse", "#shadow", "#cloud", and "#water". The generated hashtags have the expand mode (i.e. by press 'More' button).

The notation "c" indicates that the user of the electronic device (100) performs at least one of edit the generated hashtags/add new hashtags/save the hashtags in the electronic device (100). Further, the user of the electronic device (100) shares the hashtags with at least one-second user.

Figure 9A:
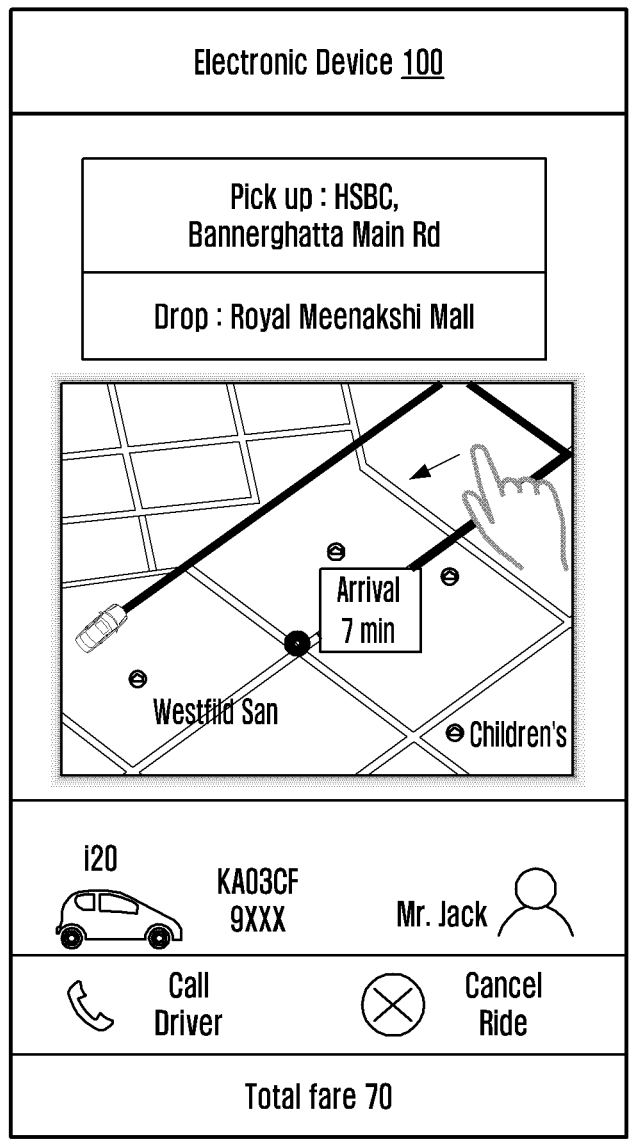
FIGS. 9A, 9B, and 9C are another example illustration to generate metadata tags for a ride service application of the electronic device, according to an embodiment as disclosed herein.
Figure 9B:
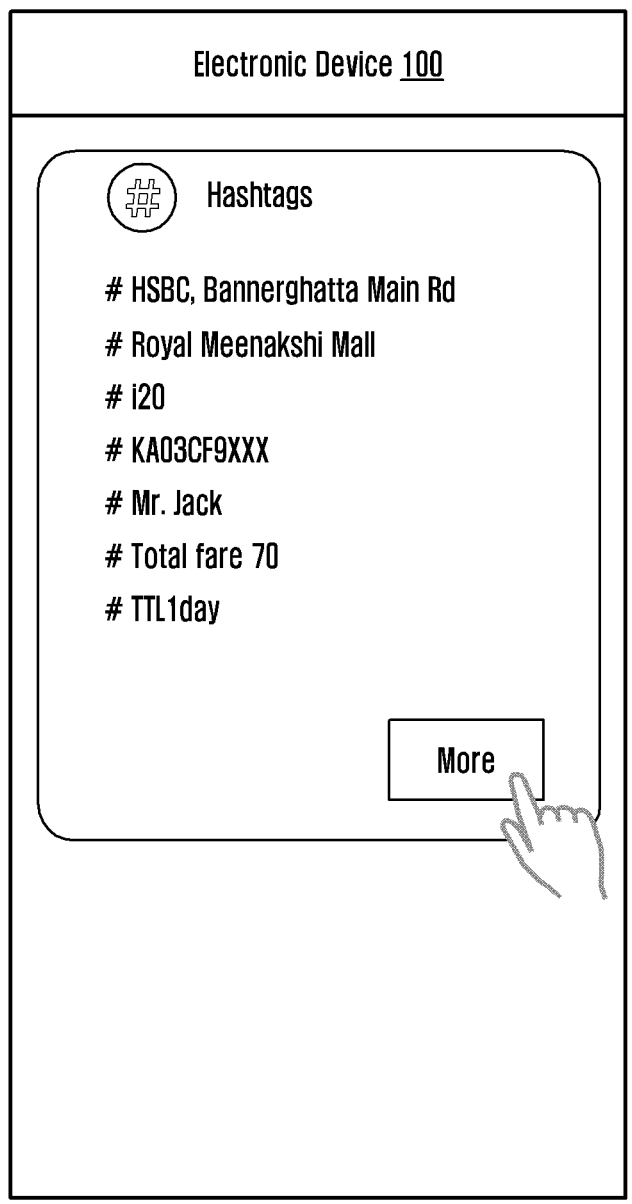
Figure 9C:
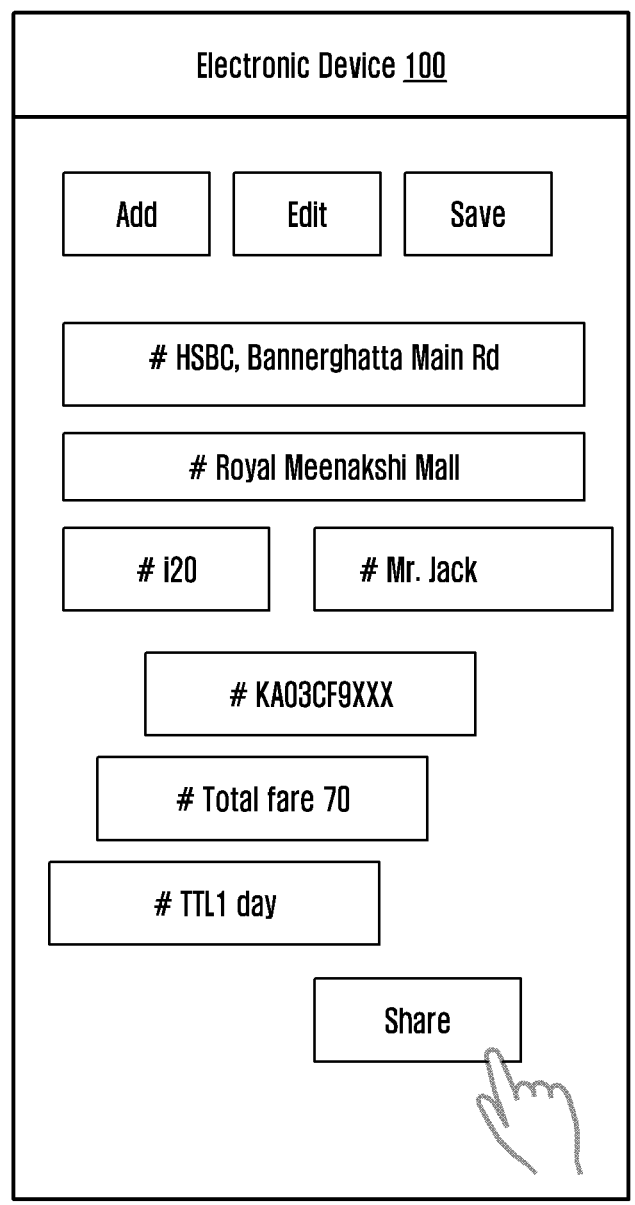
Figure 10A:
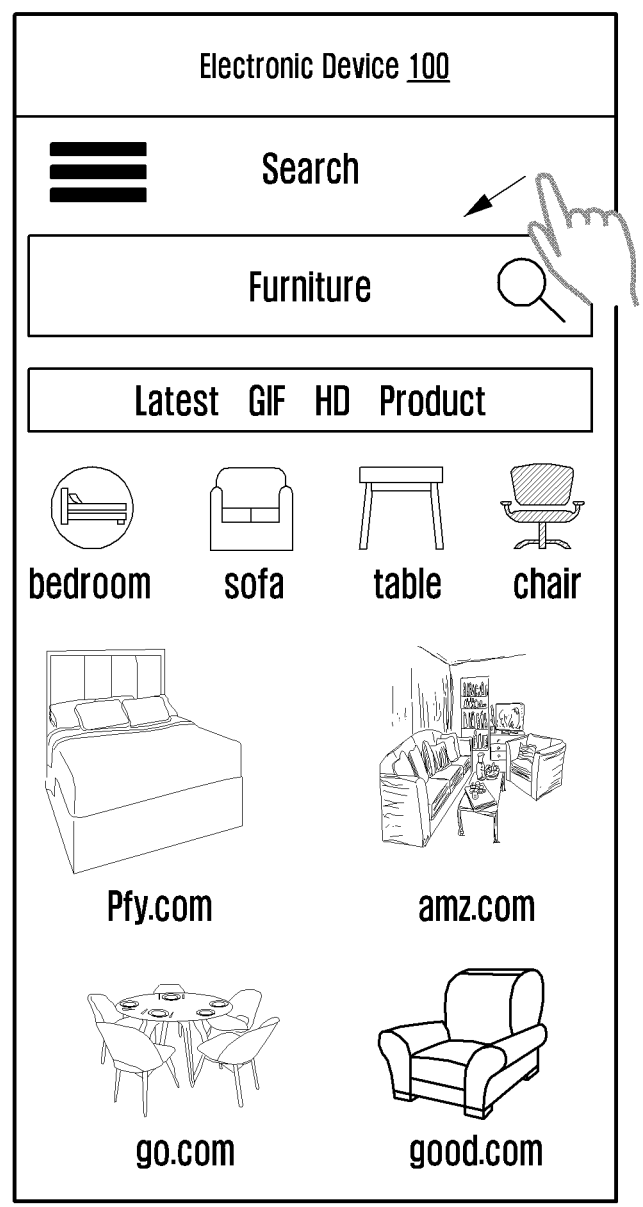
FIGS. 10A to 10F are another example illustration to learn intelligent properties of the smart summarizer to generate metadata tags for the browser application of the electronic device, according to an embodiment as disclosed herein.
Figure 10B:
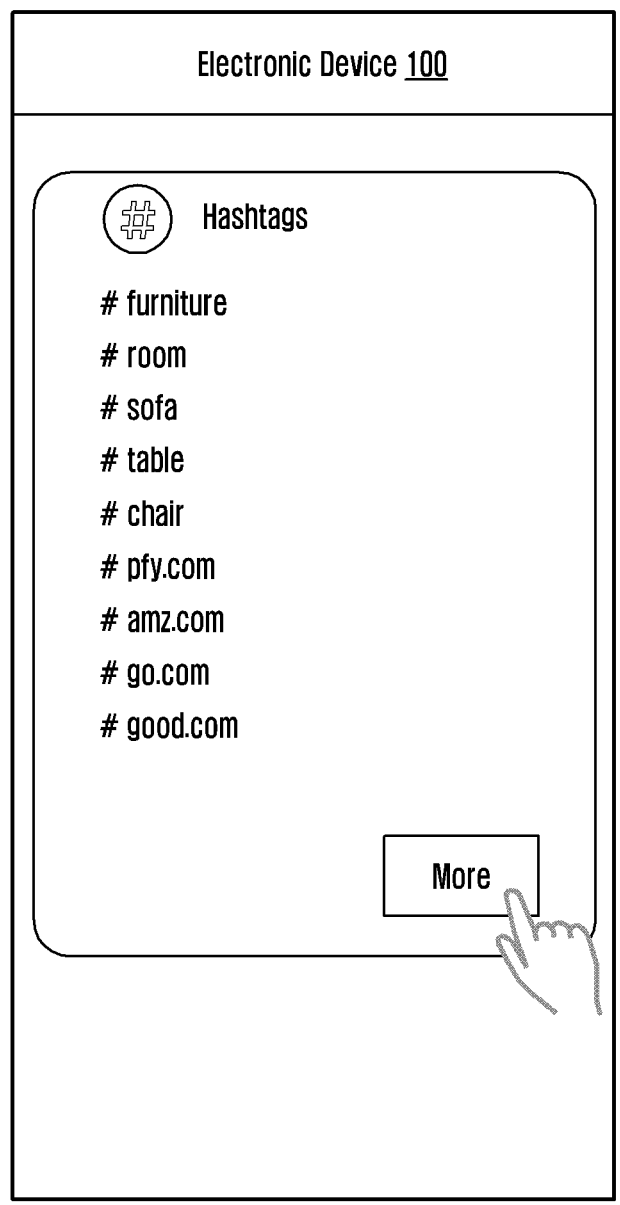
Figure 10C:
Figure 10D:
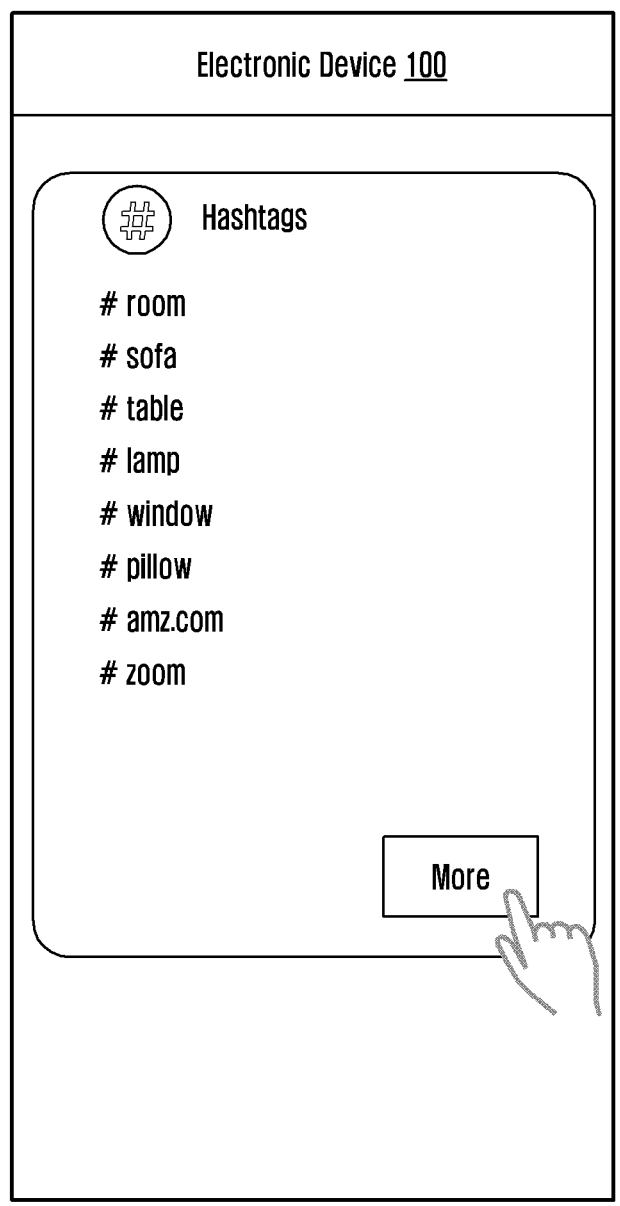
Figure 10E:
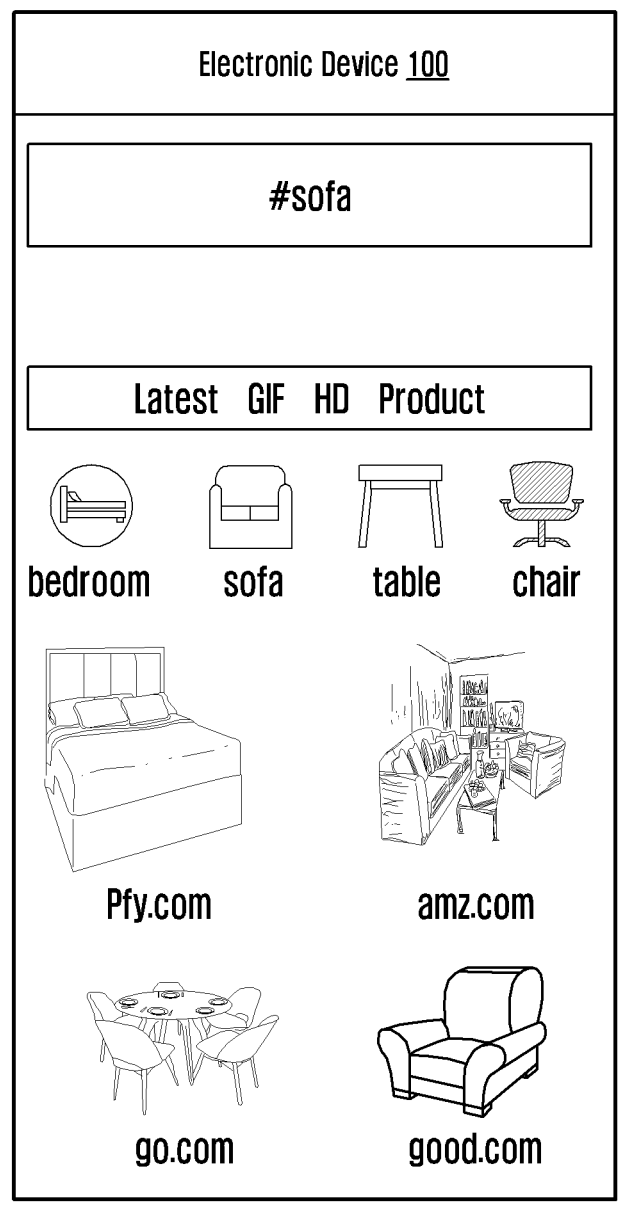
Figure 10F:
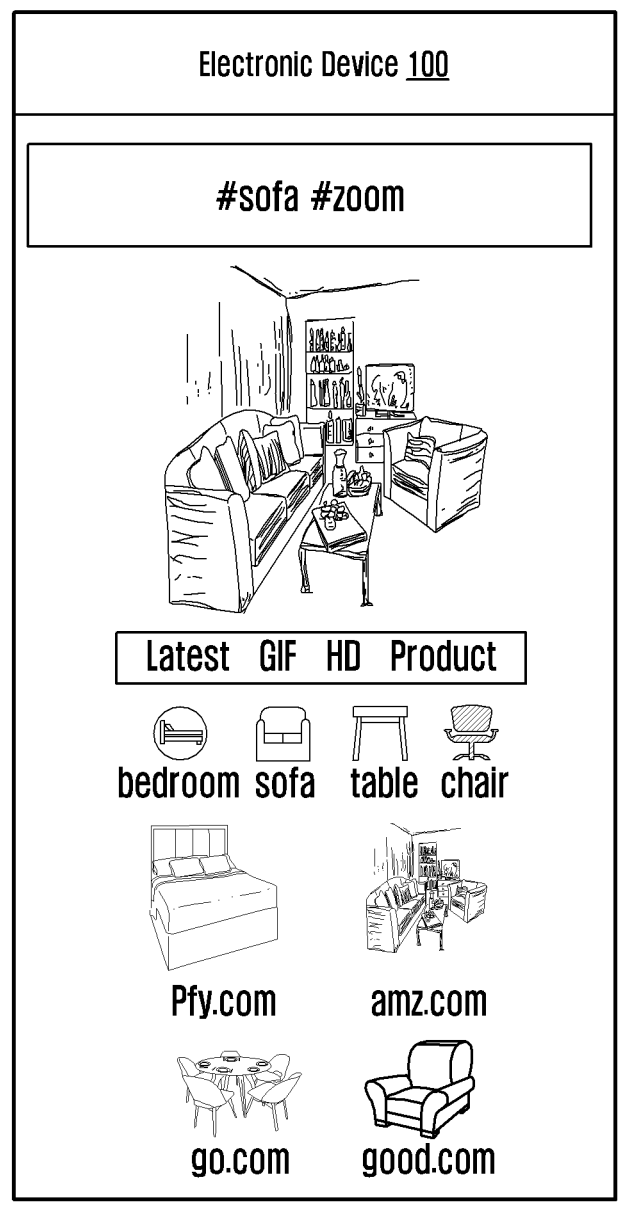
Figure 11A:
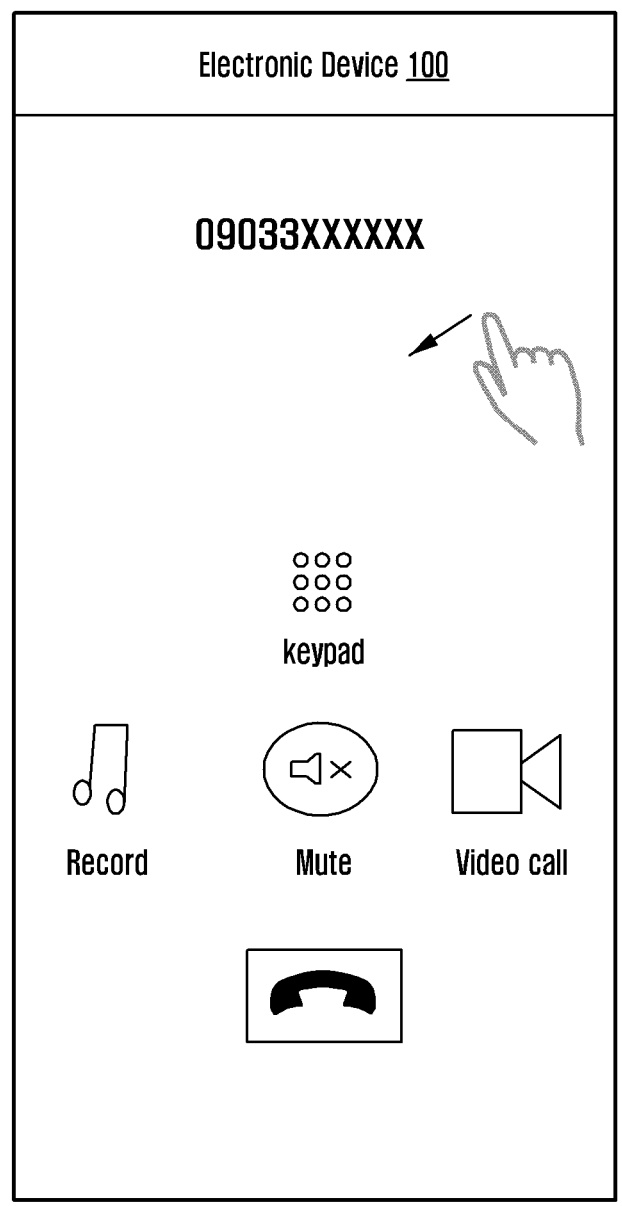
FIGS. 11A, 11B, 11C, and 11D are another example illustration to generate metadata tags created for incoming call, according to an embodiment as disclosed herein.
Figure 11B:
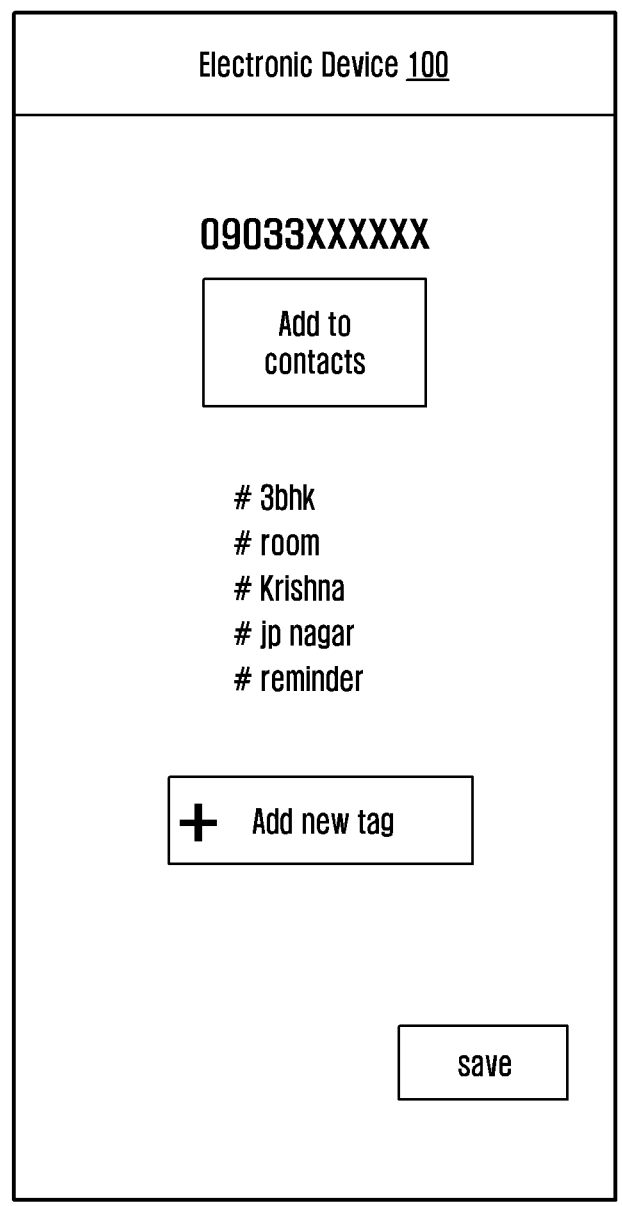
Figure 11C:
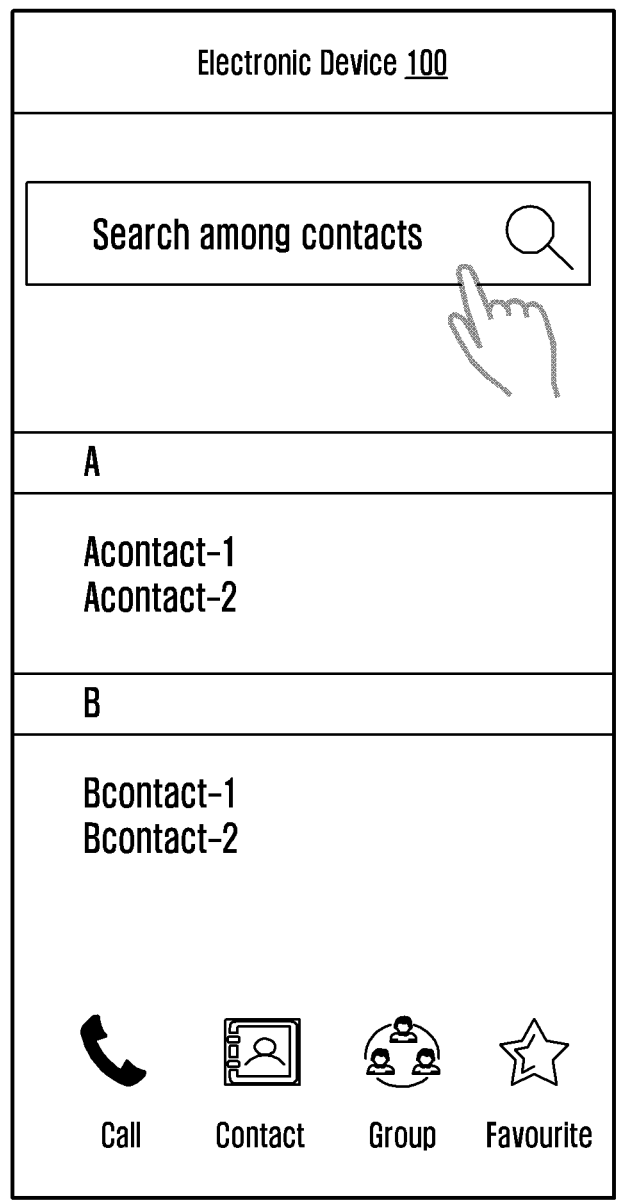
Figure 11D:
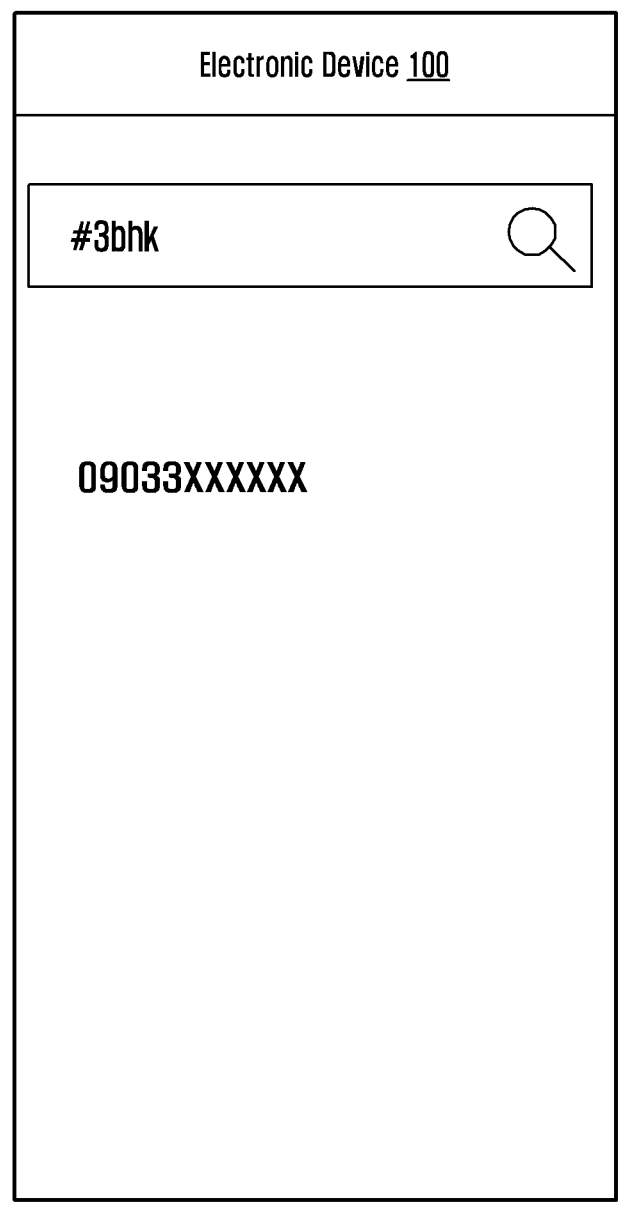
Figure 12A:
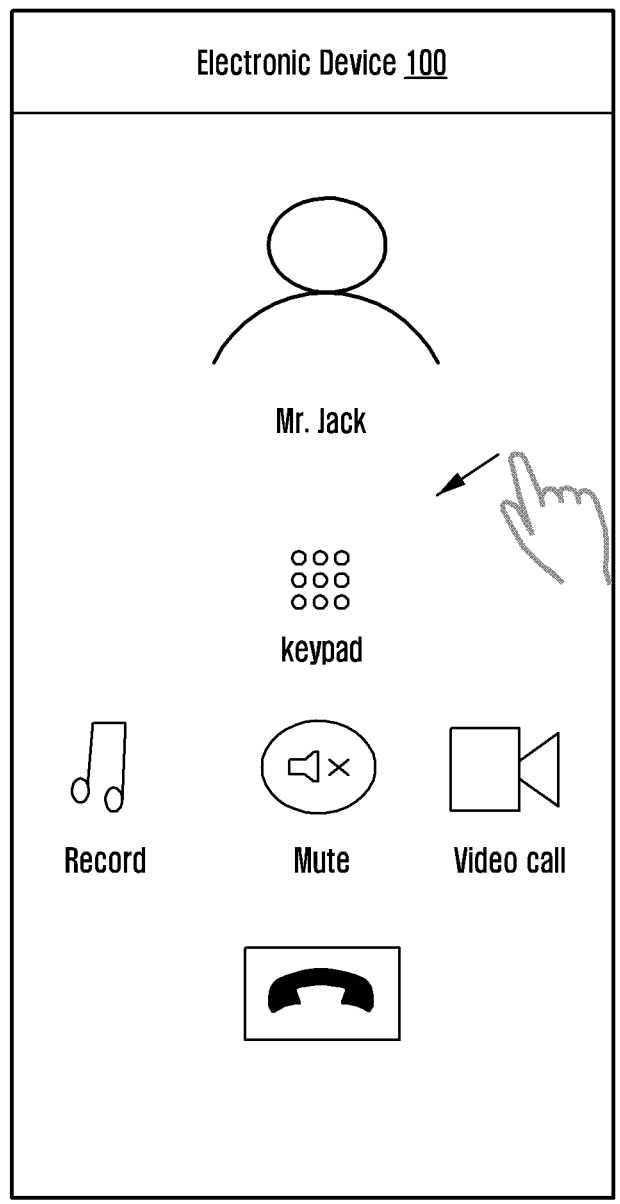
FIGS. 12A, 12B, 12C, and 12D are another example illustration of the smart summarizer generated on the basis of conversation summary for a message application of the electronic device, according to an embodiment as disclosed herein.
Figure 12B:
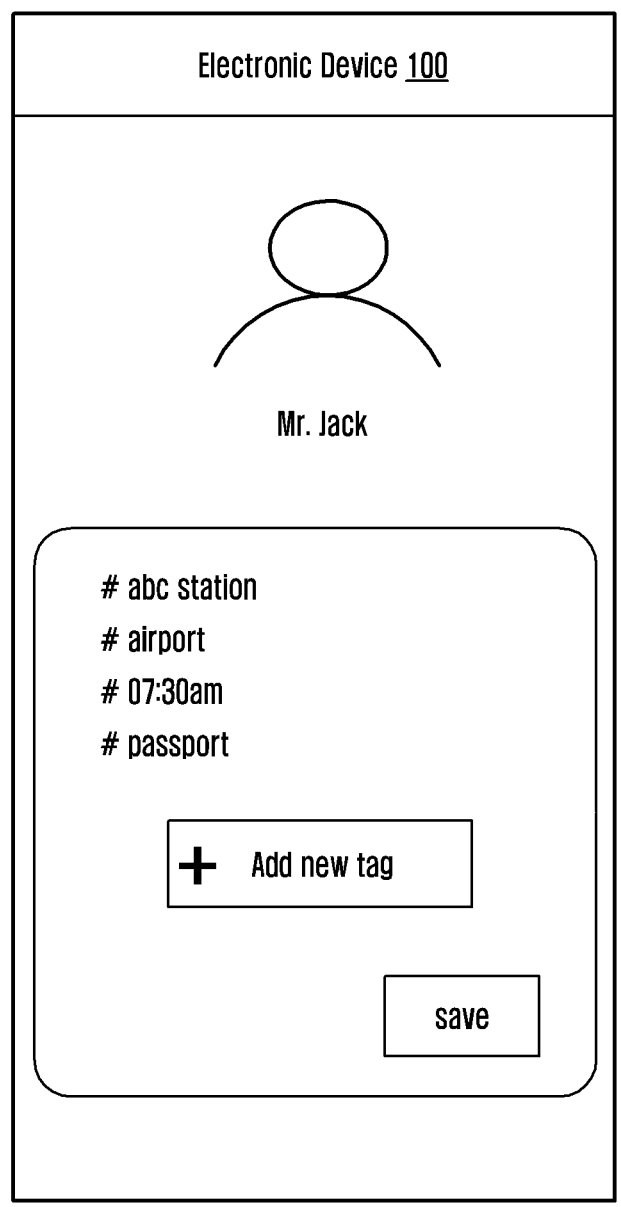
Figure 12C:
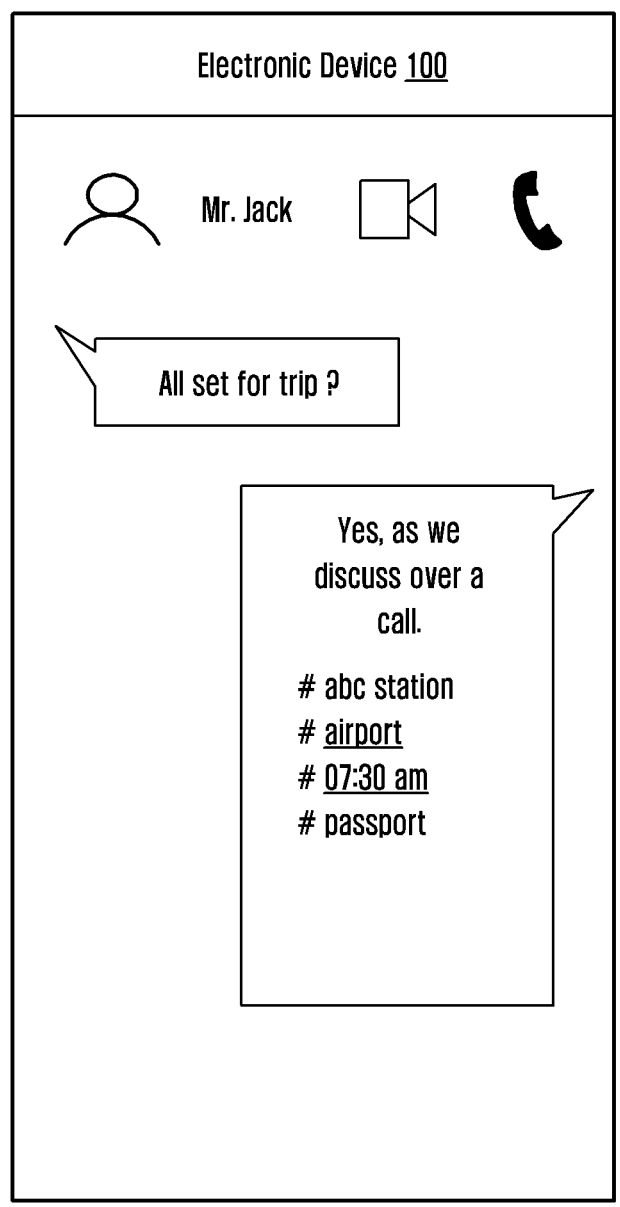
Figure 12D:
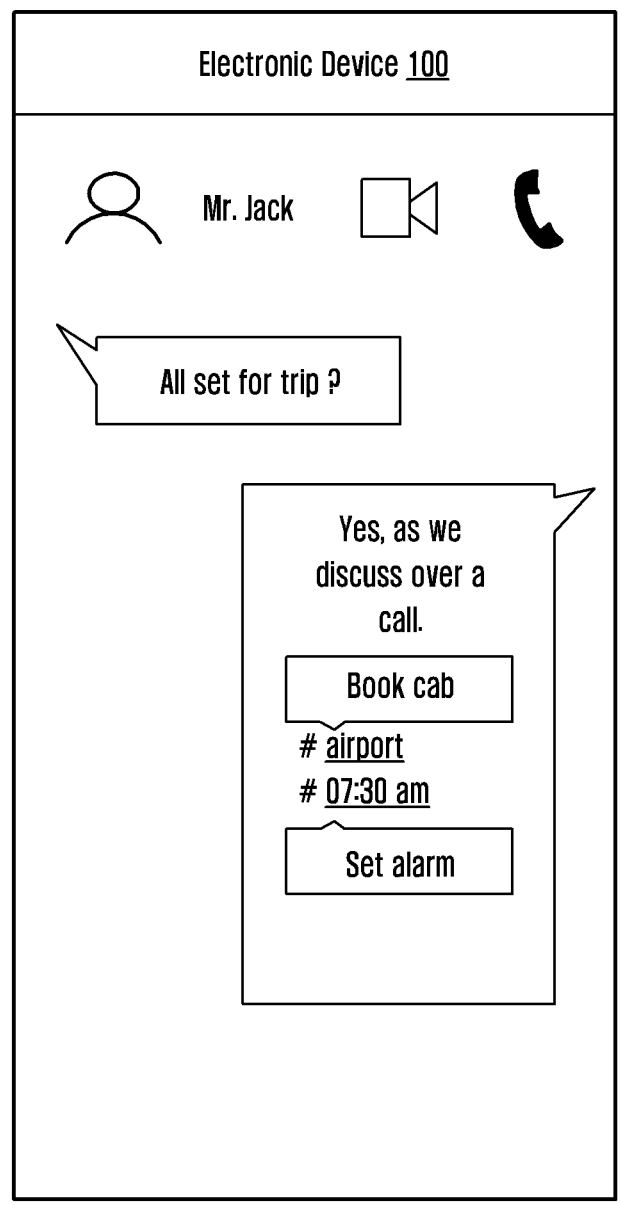
Figure 13A:
FIGS. 13A, 13B, 13C, and 13D are another example illustration to generate metadata tags for a recorder application of the electronic device, according to an embodiment as disclosed herein.
Figure 13B:
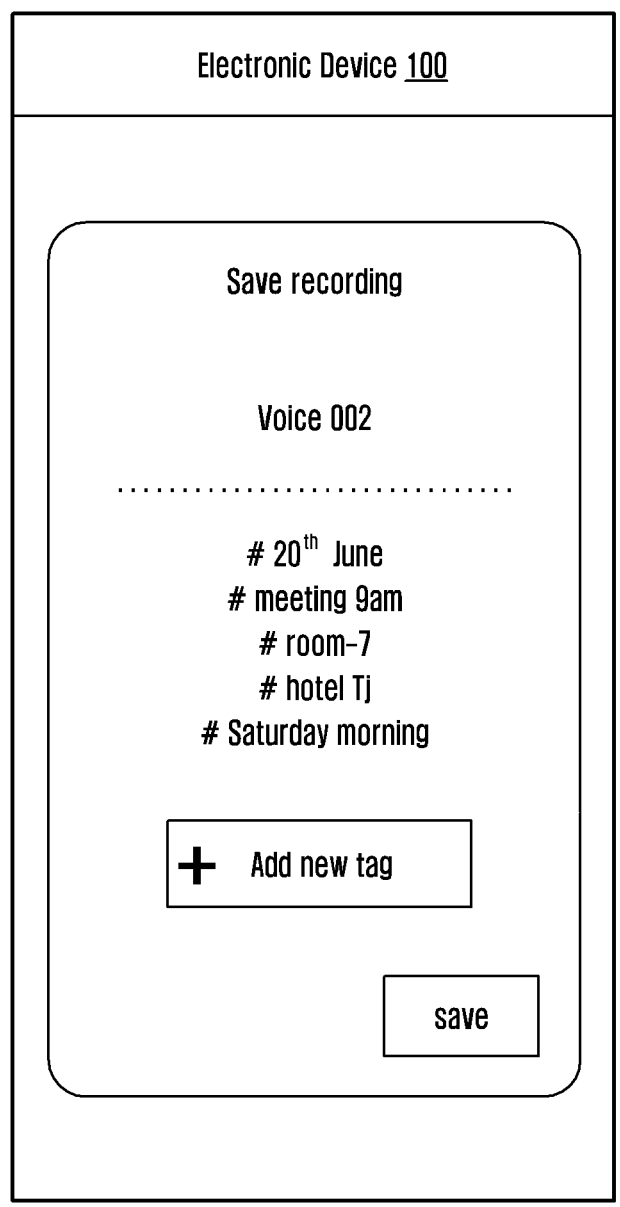
Figure 13C:
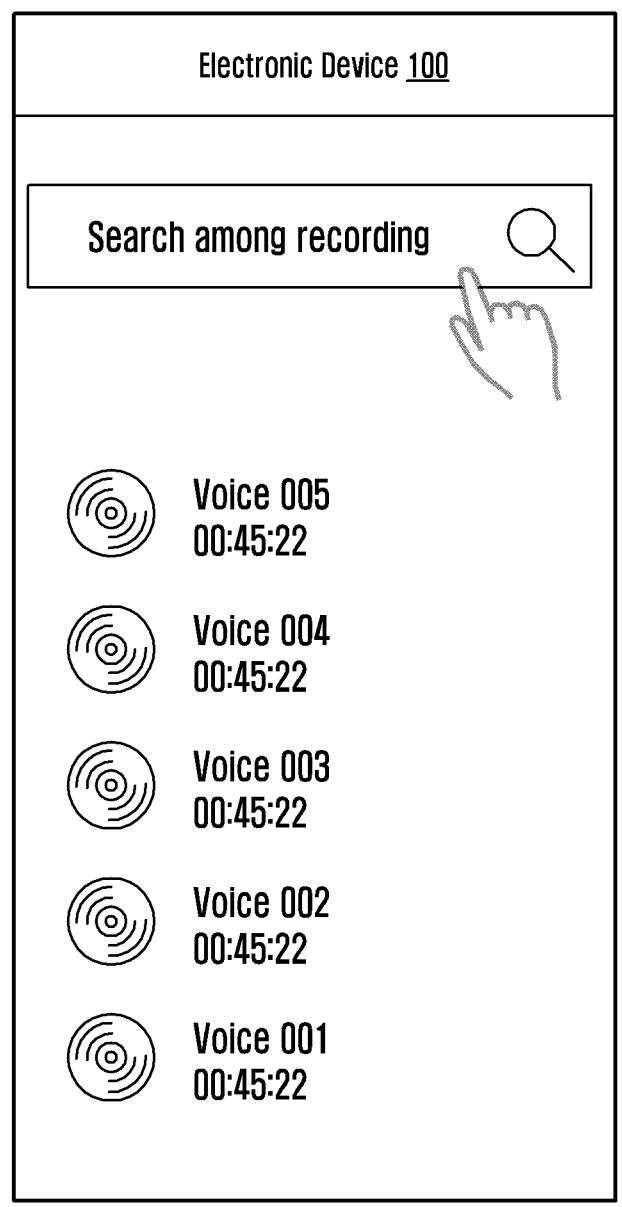
Figure 13D:
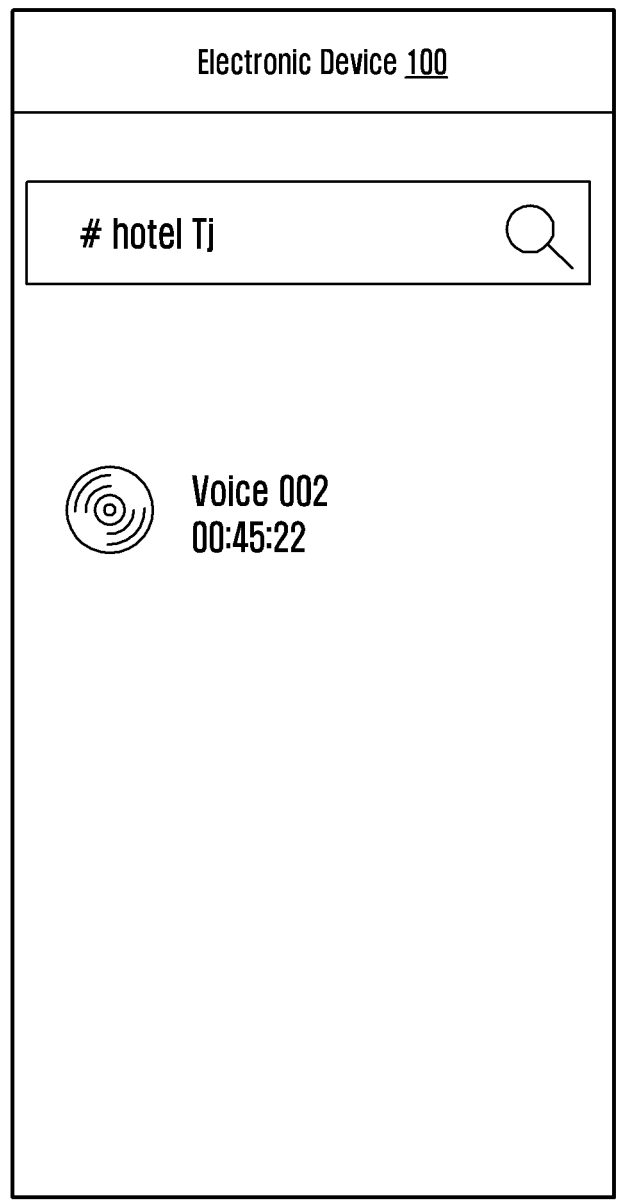

FIGS. 9A, 9B, and 9C are another example illustration to generate metadata tags for a ride service application of the electronic device (100), according to an embodiment as disclosed herein.

The notation "a" indicates that the electronic device (100) receives the input from the user of the electronic device (100). Then, the electronic device (100) analyzes screen content of the electronic device (100). In the example, the screen content is related to ride service information. The notation "b" indicates that the electronic device (100) automatically generates the at least one metadata tag (e.g. hashtags) related to the screen content and the at least one metadata tag provides based on priority of the user of the electronic device (100). In the example, the hashtags are "#HSBC, Bannerghatta Main Rd", "#Royal Meenakshi Mall", "#i20", "#KA03CF9XXX", "#Mr. Jack", "#Total fare 70", and "#TTL1 day". The generated hashtags have the expand mode (i.e. by press 'More' button). TTL1 day is time to live one day, the TTL1 day tag can be modified by the user of the electronic device (100). Further, TTL time is the time screenshot is available on the electronic device (100), after that the screenshot is automatically deleted which helps to keep the gallery organized and free of clutter.

The notation "c" indicates that the user of the electronic device (100) performs at least one of edit the generated hashtags/add new hashtags/save the hashtags in the electronic device (100). Further, the user of the electronic device (100) shares the hashtags with at least one-second user.

FIGS. 10A to 10F are another example illustration to learn intelligent properties of the smart summarizer to generate metadata tags for the browser application of the electronic device (100), according to an embodiment as disclosed herein.

The notation "a" indicates that the electronic device (100) receives the input from the user of the electronic device (100). Then, the electronic device (100) analyzes screen content of the electronic device (100). In the example, the screen content is related to furniture images. The notation "b" indicates that the electronic device (100) automatically generates the at least one metadata tag (e.g. hashtags) related to the screen content and the at least one metadata tag provides based on priority of the user of the electronic device (100). In the example, the hashtags are "#furniture", "#room", "#sofa", "#table", "#chair", "#pfy.com", "#amz.com", "#go.com" and "#good.com". The generated hashtags can be edited in the expand mode by the user of the electronic device (100). Further, the electronic device (100) stores the hashtags in the electronic device (100).

The notation "c" indicates that receives the input (e.g. zoom) from the user of the electronic device (100). Then, the electronic device (100) analyzes screen content of the electronic device (100). In the example, the screen content is related to the particular one image. The notation "d" indicates that the electronic device (100) automatically generates the at least one metadata tag (e.g. hashtags) related to the screen content and the at least one metadata tag provides based on priority of the user of the electronic device (100). In the example, the hashtags are "#room", "#sofa", "#table", "#lamp", "#window", "#"pillow", "#amz.com", and "#zoom". The generated hashtags can be edited in the expand mode by the user of the electronic device (100). Further, the electronic device (100) stores the hashtags in the electronic device (100).

The notation "e" indicates that the electronic device (100) receives at least one candidate metadata tag. In the example, the candidate metadata tag is "#sofa". Then, the electronic device (100) compares the candidate metadata tag with stored metadata tag and retrieves at least one data item (i.e. furniture images) corresponding to the at least one candidate metadata tag.

The notation "f" indicates that the electronic device (100) receives at least one candidate metadata tag. In the example, the candidate metadata tag is "#sofa" and "#zoom". Then, the electronic device (100) compares the candidate metadata tag with stored metadata tag and retrieves at least one data item (i.e. the particular one image and furniture images) corresponding to the at least one candidate metadata tag.

FIGS. 11A, 11B, 11C, and 11D are another example illustration to generate metadata tags created for incoming call, according to an embodiment as disclosed herein.

The notation "a" indicates that the electronic device (100) receives the input from the user of the electronic device (100). Then, the electronic device (100) analyzes voice content of an incoming voice call from unknown number. The notation "b" indicates that the electronic device (100) automatically generates the at least one metadata tag (e.g. hashtags) related to the incoming voice call conversation and the at least one metadata tag provides based on priority of the user of the electronic device (100). In the example, the hashtags are "#3bhk", "#room", "#Krishna", "#jp Nagar", and "#reminder". The generated hashtags can be edited in the expand mode by the user of the electronic device (100). Further, the electronic device (100) stores the hashtags.

The notation "c-d" indicates that the electronic device (100) receives at least one candidate metadata tag. In the example, the candidate metadata tag is "#3bhk". Then, the electronic device (100) compares the candidate metadata tag with stored metadata tag and retrieves at least one data item (e.g. mobile phone number) corresponding to the at least one candidate metadata tag.

FIGS. 12A, 12B, 12C, and 12D are another example illustration of the smart summarizer generated on the basis of a conversation summary for a message application of the electronic device (100), according to an embodiment as disclosed herein.

The notation "a" indicates that the electronic device (100) receives the input from the user of the electronic device (100). Then, the electronic device (100) analyzes screen content of the electronic device (100). In the example, the screen content is related to an incoming voice call from Mr. Jack (i.e. second user). The notation "b" indicates that the electronic device (100) automatically generates the at least one metadata tag (e.g. hashtags) related to the incoming voice call conversation and the at least one metadata tag provides based on priority of the user of the electronic device (100). In the example, the hashtags are "#abc station", "#airport", "#07:30 am", and "#passport". The generated hashtags can be edited in the expand mode by the user of the electronic device (100). Further, the electronic device (100) stores the hashtags.

The notation "c-d" indicates that message conversation between user of the electronic device (100) and Mr. Jack. The message conversation is related to the incoming voice call. When user of the electronic device (100) types "As discuss over a call", the electronic device (100) automatically retrieves the generated hashtag with actionable features (e.g. book cab, set alarm) and share with Mr. Jack.

FIGS. 13A, 13B, 13C, and 13D are another example illustration to generate metadata tags for a recorder application of the electronic device (100), according to an embodiment as disclosed herein.

The notation "a" indicates that the electronic device (100) receives the input from the user of the electronic device (100). Then, the electronic device (100) analyzes voice content related to a voice recording. The notation "b" indicates that the electronic device (100) automatically generates the at least one metadata tag (e.g. hashtags) related to the voice recording and the at least one metadata tag provides based on priority of the user of the electronic device (100). In the example, the hashtags are "#20th June", "#meeting 9 am", "#room-7", "#hotel Tj", and "#Saturday morning". The generated hashtags can be edited in the expand mode by the user of the electronic device (100). Further, the electronic device (100) stores the hashtags.

The notation "c-d" indicates that the electronic device (100) receives at least one candidate metadata tag. In the example, the candidate metadata tag is "#hotel Tj". Then, the electronic device (100) compares the candidate metadata tag with stored metadata tag and retrieves at least one data item (i.e. Voice 002) corresponding to the at least one candidate metadata tag.

Figure 14A:
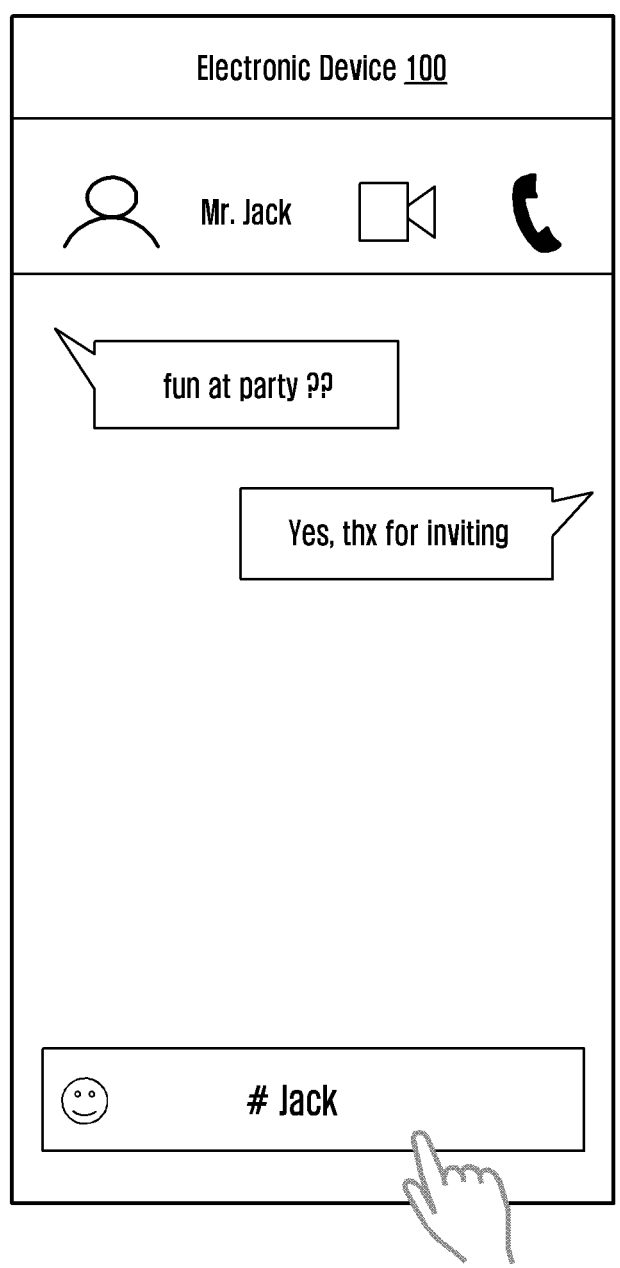
FIGS. 14A, 14B, and 14C are another example illustration of smart compose generated for the message application of the electronic device, according to an embodiment as disclosed herein.
Figure 14B:
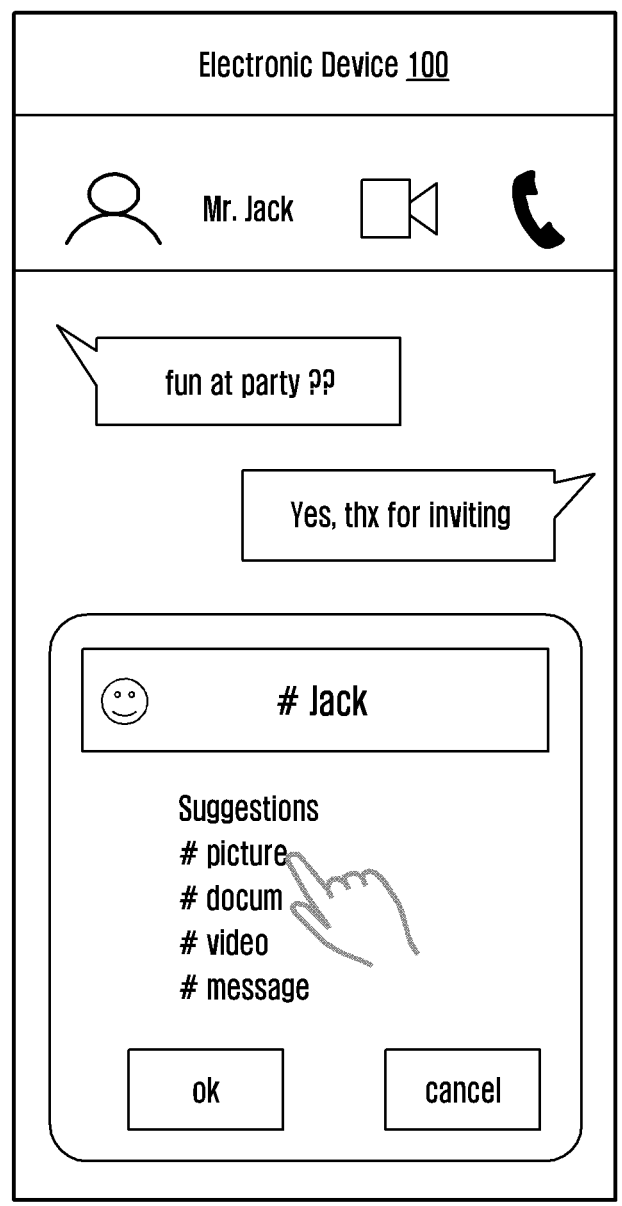
Figure 14C:
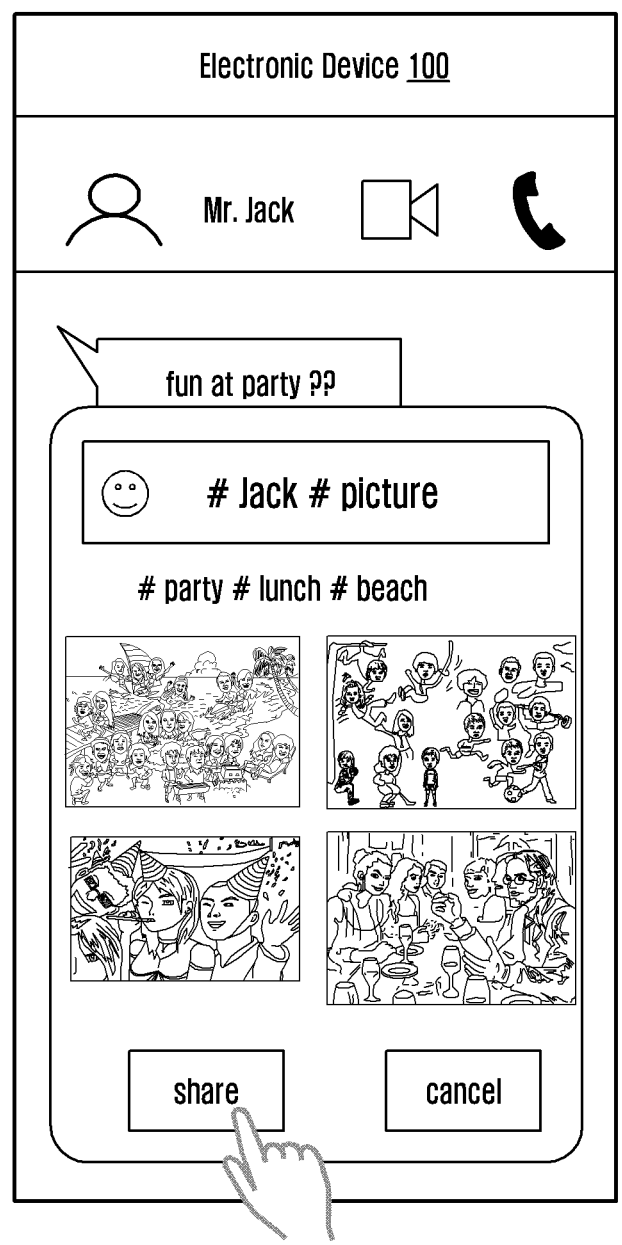

FIGS. 14A, 14B, and 14C are another example illustration of smart compose generated for the message application of the electronic device (100), according to an embodiment as disclosed herein.

The notation "a" indicates that message conversation between user of the electronic device (100) and Mr. Jack. The message conversation is related to a lunch party. The notation "b-c" indicates that when user of the electronic device (100) types "#Mr. Jack", the electronic device (100) automatically retrieves suggestions (e.g. picture, document, video, and message) related to Mr. Jack. The user of the electronic device (100) selects at least one of suggestions and share with Mr. Jack. Where suggestions keep referring based on number of metadata tags added.

Figure 15A:
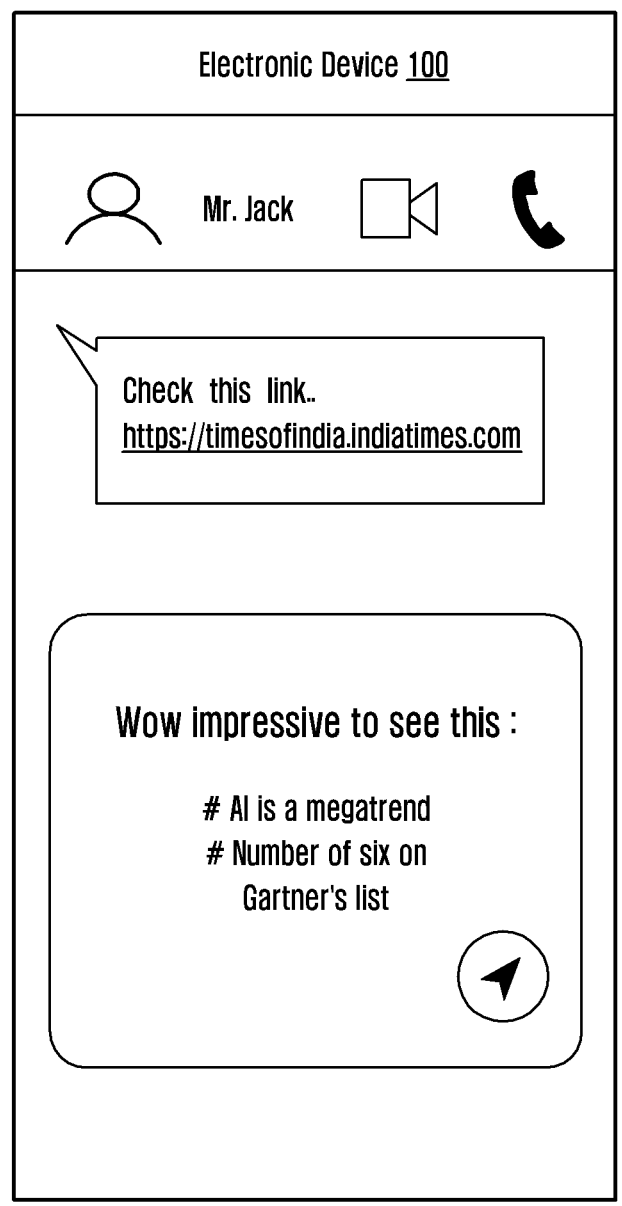
FIGS. 15A and 15B are another example illustration of smart reply, smart share and smart compose generated on the basis of received Uniform Resource Locator (URL) for the message application of the electronic device, according to an embodiment as disclosed herein.
Figure 15B:
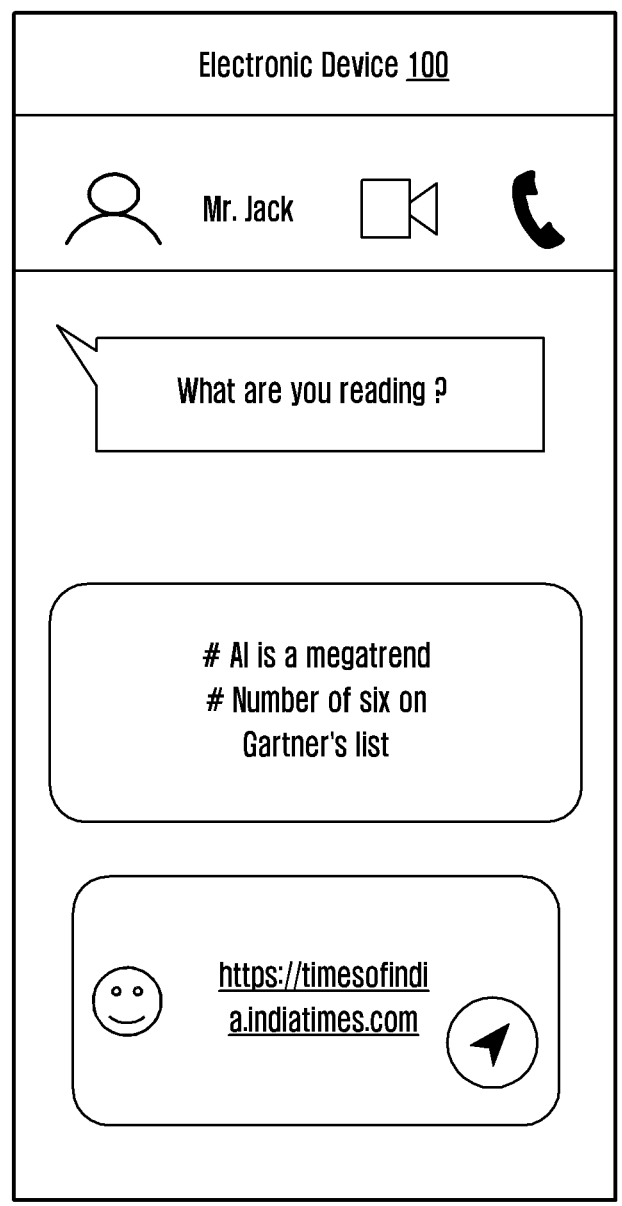

FIGS. 15A and 15B are another example illustration of smart reply, smart share and smart compose generated on the basis of received Uniform Resource Locator (URL) for the message application of the electronic device (100), according to an embodiment as disclosed herein.

The notation "a" indicates that message conversation between user of the electronic device (100) and Mr. Jack. The user of the electronic device (100) receives URL from Mr. Jack. The electronic device (100) summarizes URL content and provides summarization sentence suggestions on typing "#". The notation "b" indicates that the electronic device (100) provides intelligent suggestions to share URL.

In an embodiment, example given in the FIG. 8A, FIG. 15B of metadata tag generation can be extended for the tag summarization also.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for retrieving a metadata tag from an electronic device comprising a memory and a processor, the method comprising:
controlling, by the processor, a display of the electronic device to display content;
while the content is being displayed on the display, detecting, by the processor, an input from a user for initiating extraction of at least one metadata tag related to the content, the input comprising a direct input or an indirect input received from the user;
in response to detecting the input from the user, extracting, by the processor, features from the content;
identifying, by the processor, at least one data item of the content based on the extracted features;
in response to identifying the at least one data item, determining, by the processor, a plurality of parameters associated with the at least one data item;
based on the detecting of the input from the user, generating, by the processor, the at least one metadata tag related to the at least one data item based on the plurality of parameters, the at least one metadata tag comprising at least one hashtag and at least one highlight card providing detailed summaries of the content, and controlling, by the processor, the display to stop the displaying of the content and display the at least one metadata tag comprising the at least one hashtag and the at least one highlight card being displayed based on a specified priority of the user; and
storing, by the processor, the at least one metadata tag in the memory.

2. The method of claim 1, further comprising:
receiving, by the processor, at least one candidate metadata tag entered by the user;
comparing, by the processor, the at least one candidate metadata tag with the at least one metadata tag stored in the memory;
retrieving, by the processor, the at least one data item corresponding to the at least one candidate metadata tag in response to determining a match between the at least one candidate metadata tag with the at least one metadata tag stored in the memory; and
performing, by the processor, at least one action related to at least one of storing or sharing the at least one data item.

3. The method of claim 2, wherein the at least one data item is retrieved based on the specified priority associated with the at least one candidate metadata tag.

4. The method of claim 1, wherein the generating of the at least one metadata tag comprises:
identifying, by the processor, at least one of an image block, a text block, or an audio block available as the at least one data item in the content;
determining, by the processor, the plurality of parameters associated with the at least one of the image block, the text block, or the audio block; and
generating, by the processor, the at least one metadata tag related to the at least one data item based on the plurality of parameters.

5. The method of claim 4,
wherein the plurality of parameters of the image block comprise at least one of a scene object block, an expression block, a face block, or an activity block,
wherein the plurality of parameters of the text block comprise at least one of a keyword block, a language identification block, a classification block, a text summary block, or an electronic device content aggregator block, and
wherein the plurality of parameters of the audio block comprise at least one of an audio summary or language identification.

6. The method of claim 1, further comprising:
locally generating, by the processor, the at least one metadata tag without interacting with any network devices.

7. The method of claim 1, wherein the at least one metadata tag is customizable by at least one of editing, adding, or sharing based on the input from the user.

8. The method of claim 1, wherein the at least one data item comprises at least one of an image file, a video file, an audio file, or a text document.

9. The method of claim 1,
wherein the plurality of parameters use a knowledge graph, and
wherein the knowledge graph determines a rank of the at least one data item based on a user personalized summary.

10. The method of claim 1,
wherein the displaying of the at least one metadata tag based on the specified priority of the user comprises displaying the at least one metadata tag as the at least one hashtag and the at least one highlight card based on the specified priority of the user,
wherein the at least one hashtag is displayed above the at least one highlight card, and
wherein the at least one highlight card provides a detailed summary of the content.

11. The method of claim 1,
wherein the at least one hashtag is displayed together with a first button for displaying the at least one hashtag in expand mode, and
wherein the at least one highlight card is displayed together with a second button for displaying the at least one highlight card in expand mode.

12. An electronic device for retrieving a metadata tag, the electronic device comprising:
a display;
a processor operationally coupled to the display; and
memory storing instructions that, when executed by the processor, cause the electronic device to:
control the display to display content,
while the content is being displayed on the display, detect an input from a user for initiating extraction of at least one metadata tag related to the content, the input comprising a direct input or an indirect input received from the user,
in response to detecting the input from the user, extract features from the content,
identify at least one data item of the content based on the extracted features,
determine a plurality of parameters associated with the at least one data item,
based on the detecting of the input from the user, generate the at least one metadata tag related to the at least one data item based on the plurality of parameters, the at least one metadata tag comprising at least one hashtag and at least one highlight card providing detailed summaries of the content, and control the display to stop the displaying of the content and display the at least one metadata tag comprising the at least one hashtag and the at least one highlight card being displayed based on a specified priority of the user, and
store the at least one metadata tag in the memory.

13. The electronic device of claim 12, wherein the instructions, when executed by the processor, further cause the electronic device to:
receive at least one candidate metadata tag entered by the user,
compare the at least one candidate metadata tag with the at least one metadata tag stored in the memory,
retrieve the at least one data item corresponding to the at least one candidate metadata tag in response to determining a match between the at least one candidate metadata tag with the at least one metadata tag stored in the memory, and
perform at least one action related to at least one of storing or sharing the at least one data item.

14. The electronic device of claim 13, wherein the at least one data item is retrieved based on the specified priority associated with the at least one candidate metadata tag.

15. The electronic device of claim 12, wherein the instructions, when executed by the processor, further cause the electronic device to:
identify at least one of an image block, a text block, or an audio block available as the at least one data item in the content,
determine the plurality of parameters associated with the at least one of the image block, the text block, or the audio block, and
generate the at least one metadata tag related to the at least one data item based on the plurality of parameters.

16. The electronic device of claim 15,
wherein the plurality of parameters of the image block comprise at least one of a scene object block, an expression block, a face block, or an activity block,
wherein the plurality of parameters of the text block comprise at least one of a keyword block, a language identification block, a classification block, a text summary block, or an electronic device content aggregator block, and
wherein the plurality of parameters of the audio block comprise at least one of an audio summary or language identification.

17. The electronic device of claim 12, wherein the instructions, when executed by the processor, is further cause the electronic device to:
locally generate the at least one metadata tag without interacting with any network devices.

18. The electronic device of claim 12,
wherein the at least one metadata tag is customizable by at least one of editing, adding, or sharing based on the input from the user, and
wherein the at least one data item comprises at least one of an image file, a video file, an audio file, or a text document.

* * * * *